United States Patent
Hozuki et al.

(10) Patent No.: US 11,929,694 B2
(45) Date of Patent: Mar. 12, 2024

(54) ROTARY MACHINE CONTROL APPARATUS, MACHINE LEARNING APPARATUS, AND INFERENCE APPARATUS

(71) Applicant: Mitsubishi Electric Corporation, Tokyo (JP)

(72) Inventors: Takashi Hozuki, Tokyo (JP); Hiroatsu Fukuoka, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 18/032,569

(22) PCT Filed: May 20, 2021

(86) PCT No.: PCT/JP2021/019223
§ 371 (c)(1),
(2) Date: Apr. 19, 2023

(87) PCT Pub. No.: WO2022/244204
PCT Pub. Date: Nov. 24, 2022

(65) Prior Publication Data
US 2023/0353075 A1 Nov. 2, 2023

(51) Int. Cl.
*H02P 21/22* (2016.01)
*H02P 21/00* (2016.01)
(Continued)

(52) U.S. Cl.
CPC .......... *H02P 21/22* (2016.02); *H02P 21/0025* (2013.01); *H02P 21/141* (2013.01); *H02P 21/34* (2016.02); *H02P 2207/05* (2013.01)

(58) Field of Classification Search
CPC .... H02P 21/22; H02P 21/0025; H02P 21/141; H02P 21/34; H02P 2207/05; H02P 21/0014; H02P 23/0018; H02P 1/029
See application file for complete search history.

(56) References Cited

U.S. PATENT DOCUMENTS 8,519,649 B2 8/2013 Taniguchi et al.
8,816,622 B2 8/2014 Kato et al.
(Continued)

FOREIGN PATENT DOCUMENTS

CA 2654277 A1 * 1/2008 ............. H02P 21/02
JP 2003284381 A * 10/2003
(Continued)

OTHER PUBLICATIONS

International Search Report and Written Opinion dated Jul. 20, 2021, received for PCT Application PCT/JP2021/019223, filed on May 20, 2021, 9 pages including English Translation.
(Continued)

*Primary Examiner* — Bickey Dhakal
(74) *Attorney, Agent, or Firm* — XSENSUS LLP

(57) ABSTRACT

A rotary machine control apparatus includes: a current detector detecting an alternating current flowing through a rotary machine and outputting a current detection value; a power converter supplying power to the rotary machine by applying an AC voltage based on a voltage command value; a current controller adjusting the voltage command value so that the current detection value matches a current command value; an estimator obtaining a magnetic-flux estimation value that is an estimation value of an amplitude of a magnetic flux vector in the rotary machine; and a magnetic flux controller adjusting the current command value so that the magnetic-flux estimation value matches a set magnetic-flux command value in a start-up control period from when the rotary machine is put in a state where the rotary machine rotates by inertia after interruption of power supply of the power converter until the power supply is resumed.

11 Claims, 12 Drawing Sheets

(51) Int. Cl.
*H02P 21/14* (2016.01)
*H02P 21/34* (2016.01)

(56) References Cited

U.S. PATENT DOCUMENTS

| | | | | |
|---|---|---|---|---|
| 2009/0251083 A1* | 10/2009 | Kinpara | .................... | H02P 5/74 |
| | | | | 318/400.11 |
| 2022/0352837 A1* | 11/2022 | Tanaka | .................. | H02P 25/022 |

FOREIGN PATENT DOCUMENTS

| | | | | | |
|---|---|---|---|---|---|
| JP | 2004-040837 | A | | 2/2004 | |
| JP | 2004040986 | A | * | 2/2004 | ............. H02P 1/029 |
| JP | 2009-171712 | A | | 7/2009 | |
| JP | 2009165281 | A | * | 7/2009 | |
| JP | 2010-114969 | A | | 5/2010 | |
| JP | 2011-244655 | A | | 12/2011 | |
| JP | 5318286 | B2 | | 10/2013 | |
| JP | 2018-007390 | A | | 1/2018 | |
| JP | 2018-099025 | A | | 6/2018 | |
| WO | 2012/014443 | A1 | | 2/2012 | |
| WO | WO-2018163420 | A1 | * | 9/2018 | ............. B60L 15/025 |
| WO | WO-2019093064 | A1 | * | 5/2019 | ............. H02P 21/16 |

OTHER PUBLICATIONS

Boldea et al., "Active Flux Concept for Motion-Sensorless Unified AC Drives", IEEE Transactions on Power Electronics, vol. 23, No. 5, Sep. 2008, pp. 2612-2618.

Decision to Grant dated Feb. 8, 2022, received for JP Application 2021-567903, 5 pages including English Translation.

* cited by examiner

ROTARY MACHINE CONTROL APPARATUS, MACHINE LEARNING APPARATUS, AND INFERENCE APPARATUS

CROSS-REFERENCE TO RELATED APPLICATION

The present application is based on PCT filing PCT/JP2021/019223, filed May 20, 2021, the entire contents of which are incorporated herein by reference.

FIELD

The present disclosure relates to a rotary machine control apparatus, a machine learning apparatus, and an inference apparatus, which are used to control a rotary machine.

BACKGROUND

Conventionally, a position sensor that detects a rotor position in an AC rotary machine has been used for vector control that is one of control methods to be performed by a rotary machine control apparatus. In addition, sensorless vector control has been known as a method for controlling an AC rotary machine without using a position sensor, in which a phase of a magnetic flux vector is obtained as a result of detection of an induced voltage generated by rotation of the magnetic flux vector in the AC rotary machine, and a rotor position synchronized with the phase of the magnetic flux vector is obtained. The sensorless vector control eliminates the need to provide an AC rotary machine with a position sensor that is a delicate precision instrument, thereby making it possible to reduce failure and to reduce cost.

In the sensorless vector control, a rotary machine control apparatus generally estimates an induced voltage on the basis of a voltage command value inputted to an electric power converter or a detection value of an electric current flowing through an AC rotary machine. In the case of estimating the induced voltage on the basis of the voltage command value or the current detection value, the rotary machine control apparatus cannot detect the phase nor frequency of a magnetic flux vector when the AC rotary machine is in a free-run state. The free-run state refers to a state in which a rotor continues to rotate through inertia after power supply from the power converter is interrupted in the state where the rotor is rotating. The phase and frequency cannot be detected when the AC rotary machine being in the free-run state is started up, so that it is difficult to perform appropriate current control. Thereby, starting up of the AC rotary machine being in the free-run state is difficult because of generation of excessive torque or occurrence of pulsation in current or frequency. In a case where torque to be generated is regenerative torque, a rapid increase in DC bus voltage of the power converter may cause a failure in the power converter.

In this situation, a technique has been proposed in which AC voltage is applied to an AC rotary machine according to a certain voltage command value in a start-up control period from when the AC rotary machine is in the free-run state until the AC rotary machine returns to a state of normal control, and the phase and frequency of a magnetic flux vector are estimated on the basis of the voltage command value and a current detection value. Patent Literature 1 discloses a rotary machine control apparatus that determines a voltage command value by performing current control to set the current command value to zero in the start-up control period.

CITATION LIST

Patent Literature

Patent Literature 1: Japanese Patent Application Laid-open No. 2004-40837

SUMMARY

Technical Problem

In the start-up control period, it is desirable to set a voltage command value that enables generation of excessive torque, occurrence of pulsation, and an increase in DC bus voltage to be reduced as much as possible. Therefore, it is desirable to determine the voltage command value by performing current control using a minuter current command value. However, if a current command value to be used in the start-up control period is small, generation of excessive torque can be reduced, but magnetic flux to be generated by excitation in an AC rotary machine also decreases. Magnetic flux becomes more unstable as the magnetic flux is smaller. For this reason, a certain time constant is required until an estimated phase or frequency becomes stable, so that the start-up control period becomes longer. In addition, small and unstable magnetic flux causes unintended torque and current or frequency pulsation more easily. In the conventional technique according to Patent Literature 1, the current control is performed with setting a current command value to zero. Therefore, the conventional technique of Patent Literature 1 has a problem in that a length of time required for the start-up of the machine from a free-run state becomes longer, and unintended torque generation or occurrence of current or frequency pulsation cannot be reduced.

The present disclosure has been made in view of the above circumstances, and an object of the present disclosure is to provide a rotary machine control apparatus capable of shortening a length of time required for the start-up of a rotary machine from a free-run state thereof and capable of reducing an unintended torque and occurrence of current or frequency pulsation.

Solution to Problem

In order to solve the above-mentioned problems and achieve the object, the present disclosure provide a rotary machine control apparatus comprising: a current detector to detect an alternating current flowing through a rotary machine and output a current detection value; a power converter to supply power to the rotary machine by applying an AC voltage based on a voltage command value; a current controller to adjust the voltage command value so that the current detection value matches a current command value; an estimator to obtain a magnetic-flux estimation value that is an estimation value of an amplitude of a magnetic flux vector in the rotary machine; and a magnetic flux controller to adjust the current command value so that the magnetic-flux estimation value matches a set magnetic-flux command value, in a start-up control period from when the rotary machine is put in a state where the rotary machine rotates by inertia after interruption of power supply from the power converter to the rotary machine until the power supply to the rotary machine is resumed.

Advantageous Effects of Invention

The rotary machine control apparatus according to the present disclosure has an advantageous effect that it can shorten a length of time required for the start-up of a rotary machine from a free-run state thereof and an reduce unintended torque and occurrence of current or frequency pulsation.

DESCRIPTION OF EMBODIMENTS

Hereinafter, a rotary machine control apparatus, a machine learning apparatus, and an inference apparatus according to embodiments will be described in detail with reference to the drawings.

First Embodiment

Figure 1:
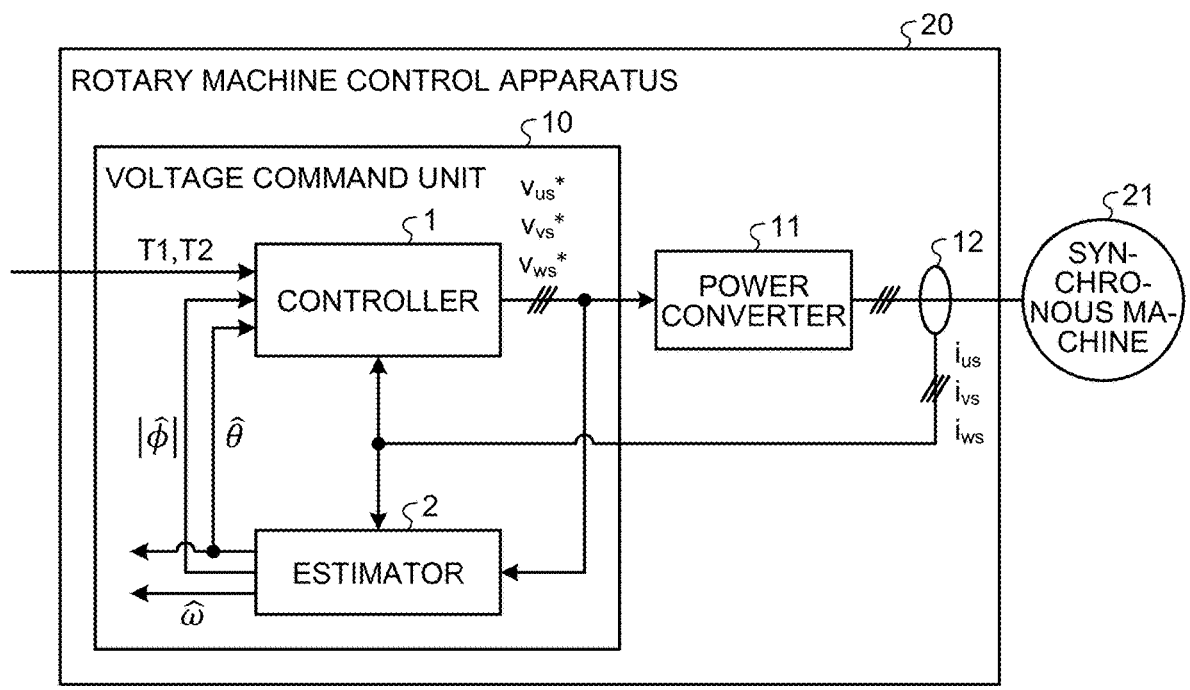
FIG. 1 is a diagram showing a configuration example of a rotary machine control apparatus according to a first embodiment.

FIG. 1 is a diagram showing a configuration example of a rotary machine control apparatus 20 according to a first embodiment. The rotary machine control apparatus 20 controls a synchronous machine 21 which is an AC rotary machine. In the following description, two axes in a fixed coordinate system are referred to as an α-axis and a β-axis, and two axes in a rotating coordinate system are referred to as a d-axis and a q-axis. In the first embodiment, there is described a case where a control phase is synchronized with a phase of a primary magnetic flux vector. In the case of performing coordinate transformation to rotational coordinates such that a direction of the primary magnetic flux vector is set as a reference d-axis with use of the phase of the primary magnetic flux vector, the d-axis and the q-axis are represented as a ds-axis and a qs-axis, respectively. The ds-axis is an axis in the direction of the primary magnetic flux vector. The qs-axis is an axis in a direction orthogonal to the primary magnetic flux vector.

In the present specification, a primary magnetic flux refers to stator flux. A secondary magnetic flux refers to magnetic flux corresponding to a field of the synchronous machine 21. For example, when the synchronous machine 21 is a non-salient-pole machine, the secondary magnetic flux is magnetic flux to be generated by a field a rotor has. When the synchronous machine 21 is a salient-pole machine, the secondary magnetic flux is magnetic flux into which a magnetic flux generated by the field the rotor has and a magnetic flux generated by saliency of the rotor are combined. When the synchronous machine 21 is a synchronous machine having no field in a rotor as with a reluctance-type synchronous machine, the secondary magnetic flux is magnetic flux to be generated by the saliency of the rotor.

The rotary machine control apparatus 20 includes a voltage command unit 10, a power converter 11, and a current detector 12. The voltage command unit 10 outputs voltage command values $v_{us}^*$, $v_{vs}^*$, and $v_{ws}^*$ based on current detection values $i_{us}$, $i_{vs}$, and $i_{ws}$. The power converter 11 supplies power to the synchronous machine 21 by applying AC voltages based on the voltage command values $v_{us}^*$, $v_{vs}^*$, and $v_{ws}^*$. The current detector 12 detects alternating electric currents flowing through the synchronous machine 21, and outputs the current detection values $i_{us}$, $i_{vs}$, and $i_{ws}$.

The voltage command unit 10 includes a controller 1 and an estimator 2. The controller 1 generates the voltage command values $v_{us}^*$, $v_{vs}^*$, and $v_{ws}^*$. The estimator 2 estimates magnetic fluxes, a phase, and a frequency. The estimator 2 obtains a magnetic-flux estimation value $|\hat{\phi}|$ that is an estimation value of the amplitude of a magnetic flux vector in the synchronous machine 21. The estimator 2 obtains a phase estimation value $\hat{\theta}$ that is an estimation value of the phase of the magnetic flux vector. The estimator 2 obtains a frequency estimation value $\hat{\omega}$ that is an estimation value of the frequency of the magnetic flux vector. The magnetic-flux estimation value $|\hat{\phi}|$ and the phase estimation value $\hat{\theta}$ outputted from the estimator 2 are inputted to the controller 1 and used to control the synchronous machine 21 in a start-up control period. In addition, the phase estimation value $\hat{\theta}$ and the frequency estimation value $\hat{\omega}$ outputted from the estimator 2 can also be used for control when the synchronous machine 21 returns to a normal driving state from a free-run state. Variables marked with the symbol "^" represent estimation values.

Figure 2:
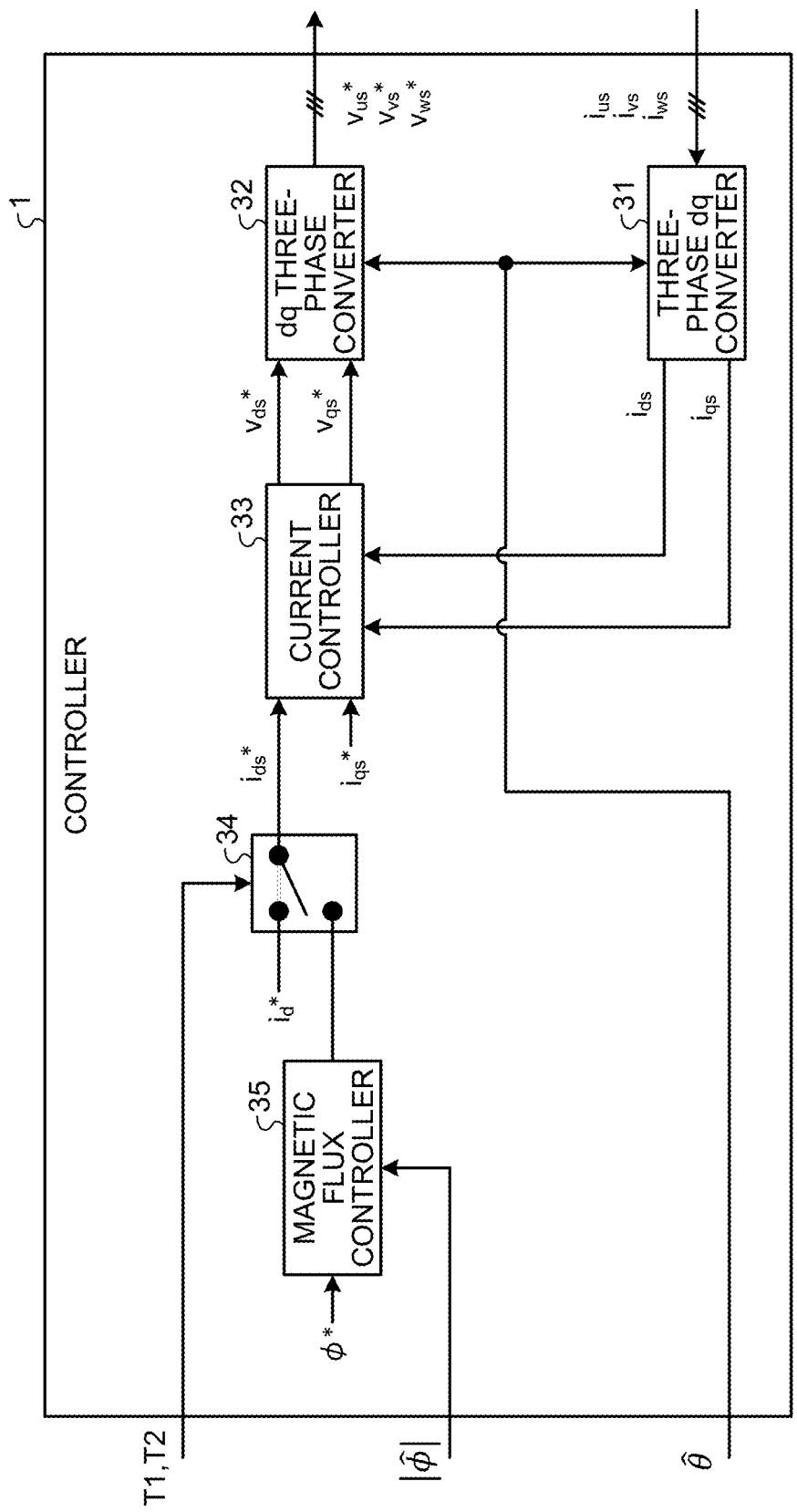
FIG. 2 is a diagram showing a configuration example of a controller included in the rotary machine control apparatus according to the first embodiment.

FIG. 2 is a diagram showing a configuration example of the controller 1 included in the rotary machine control apparatus 20 according to the first embodiment. The controller 1 includes a three-phase dq converter 31, a dq three-phase converter 32, a current controller 33, a switching unit 34, and a magnetic flux controller 35.

The current detection values $i_{us}$, $i_{vs}$, and $i_{ws}$ and the phase estimation value $\hat{\theta}$ are inputted to the three-phase dq converter 31. The three-phase dq converter 31 outputs a ds-axis current detection value $i_{ds}$ and a qs-axis current detection value $i_{qs}$ by coordinate transformation of the current detection values $i_{us}$, $i_{vs}$, and $i_{ws}$ based on the phase estimation value $\theta\hat{}$.

The ds-axis current detection value $i_{ds}$, the qs-axis current detection value $i_{qs}$, a ds-axis current command value $i_{ds}*$, and a qs-axis current command value $i_{qs}*$ are inputted to the current controller 33. The current controller 33 obtains a ds-axis voltage command value $v_{ds}*$ and a qs-axis voltage command value $v_{qs}*$ such that the ds-axis current detection value $i_{ds}$ matches the ds-axis current command value $i_{ds}*$ and the qs-axis current detection value $i_{qs}$ matches the qs-axis current command value $i_{qs}*$. The current controller 33 outputs the ds-axis voltage command value $v_{ds}*$ and the qs-axis voltage command value $v_{qs}*$. That is, the current controller 33 adjusts the voltage command values so that the current detection values match the current command values.

The ds-axis voltage command value $v_{ds}*$, the qs-axis voltage command value $v_{qs}*$, and the phase estimation value $\theta\hat{}$ are inputted to the dq three-phase converter 32. The dq three-phase converter 32 outputs the voltage command values $v_{us}*$, $v_{vs}*$, and $v_{ws}*$ by coordinate transformation of the ds-axis voltage command value $v_{ds}*$ and the qs-axis voltage command value $v_{qs}*$ based on the phase estimation value $\theta\hat{}$. The voltage command unit 10 outputs the voltage command values $v_{us}*$, $v_{vs}*$, and $v_{ws}*$ to the power converter 11.

The magnetic-flux estimation value $|\phi\hat{}|$ and a magnetic-flux command value $\phi*$ that has been set in advance are inputted to the magnetic flux controller 35. The magnetic flux controller 35 obtains a command value of an excitation current such that the magnetic-flux estimation value $|\phi\hat{}|$ matches the magnetic-flux command value $\phi*$. That is, the magnetic flux controller 35 adjusts the current command value such that the magnetic-flux estimation value $|\phi\hat{}|$ matches the set magnetic-flux command value $\phi*$. The magnetic flux controller 35 outputs a d-axis excitation current command value.

The switching unit 34 outputs, as the ds-axis current command value $i_{ds}*$, any one of a d-axis current command value $i_d*$ and the d-axis excitation current command value. The d-axis current command value $i_d*$ is an excitation current command value that has been set in advance. The d-axis excitation current command value is outputted from the magnetic flux controller 35. Information indicating a current control period T1 and information indicating a magnetic-flux control period T2 are inputted to the switching unit 34. The switching unit 34 selects any one of the d-axis current command value $i_d*$ and the d-axis excitation current command value outputted from the magnetic flux controller 35, on the basis of the information on the current control period T1 and the information on the magnetic-flux control period T2. The current control period T1 and the magnetic-flux control period T2 will be described later. The ds-axis current command value $i_{ds}*$ is inputted to the current controller 33.

Figure 3:
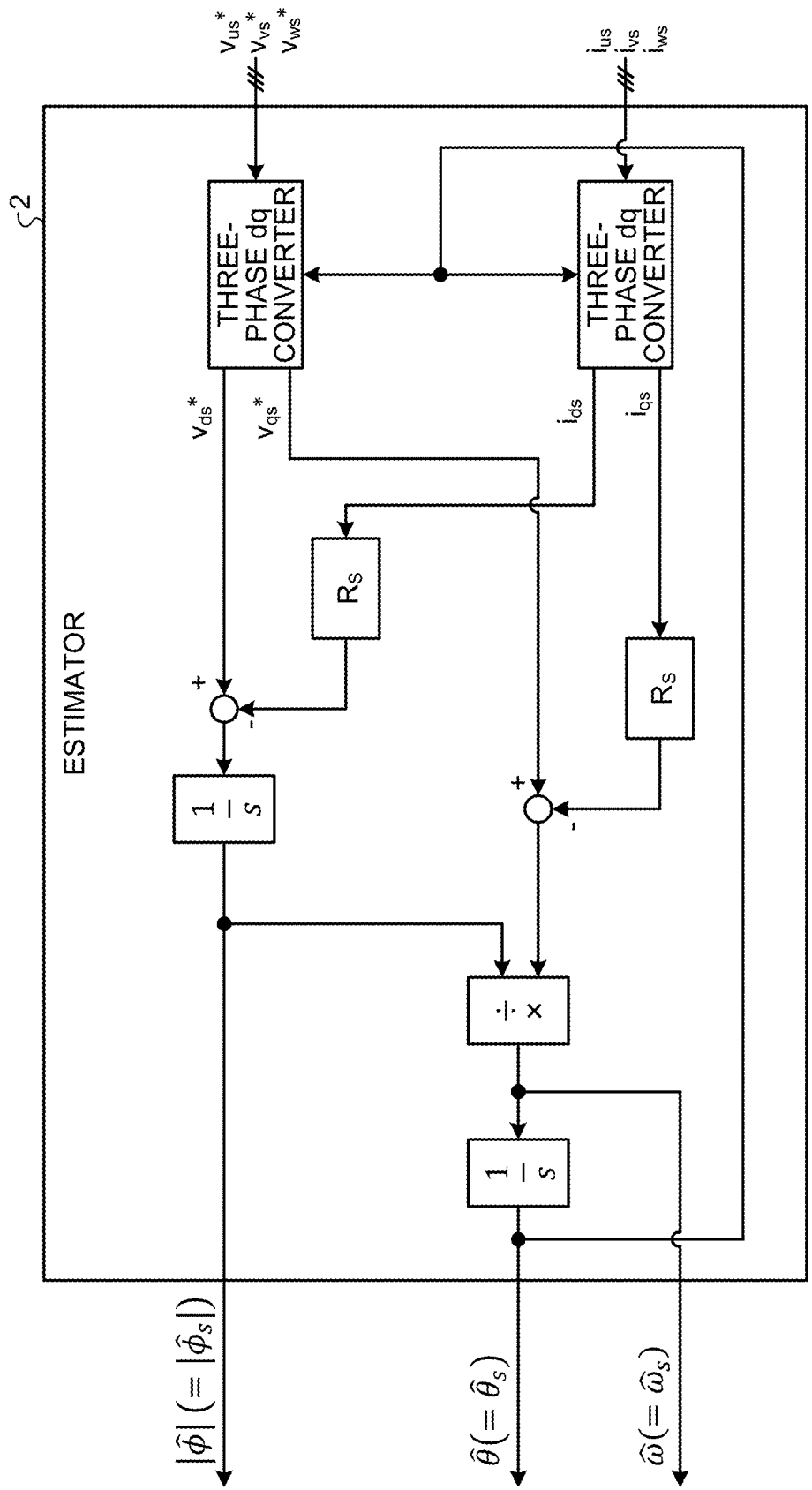
FIG. 3 is a diagram showing a configuration example of an estimator included in the rotary machine control apparatus according to the first embodiment.

FIG. 3 is a diagram showing a configuration example of the estimator 2 included in the rotary machine control apparatus 20 according to the first embodiment. The estimator 2 operates during the entire start-up control period. The voltage command values $v_{us}*$, $v_{vs}*$, and $v_{ws}*$ and the current detection values $i_{us}$, $i_{vs}$, and $i_{ws}$ are inputted to the estimator 2. One of two three-phase dq converters in the estimator 2 outputs the ds-axis voltage command value $v_{ds}*$ and the qs-axis voltage command value $v_{qs}*$ by coordinate transformation of the voltage command values $v_{us}*$, $v_{vs}*$, and $v_{ws}*$ based on the phase estimation value $\theta\hat{}$. The other of the two three-phase dq converters in the estimator 2 outputs the ds-axis current detection value $i_{ds}$ and the qs-axis current detection value $i_{qs}$ by coordinate transformation of the current detection values $i_{us}$, $i_{vs}$, and $i_{ws}$ based on the phase estimation value $\theta\hat{}$.

A ds-axis primary voltage $v_{ds}$ and a qs-axis primary voltage $v_{qs}$ of the synchronous machine 21 are represented by the following expression (1). Note that $\phi_{ds}$ denotes a ds-axis primary magnetic flux, $\phi_{qs}$ denotes a qs-axis primary magnetic flux, $i_{ds}$ denotes a ds-axis primary current, $i_{qs}$ denotes a qs-axis primary current, $R_s$ denotes a primary phase resistance, $\omega_s$ denotes the frequency of a primary magnetic flux vector, and s denotes a Laplace operator.

Formula 1:

$$\begin{bmatrix} v_{ds} \\ v_{qs} \end{bmatrix} = \begin{bmatrix} R_s & 0 \\ 0 & R_s \end{bmatrix}\begin{bmatrix} i_{ds} \\ i_{qs} \end{bmatrix} + \begin{bmatrix} s & -\omega_s \\ \omega_s & s \end{bmatrix}\begin{bmatrix} \phi_{ds} \\ \phi_{qs} \end{bmatrix} \quad (1)$$

When the control phase is synchronized with the phase of the primary magnetic flux vector, $\phi_{qs}=0$ is satisfied. Therefore, an amplitude $|\phi_s|$ of the primary magnetic flux vector is equal to the ds-axis primary magnetic flux $\phi_{ds}$. The amplitude $|\phi_s|$ of the primary magnetic flux vector is represented by the following expression (2). With the configuration of FIG. 3, the estimator 2 performs calculation shown in the expression (2) using the voltage command values and the current detection values to estimate the amplitude $|\phi_s|$ of the primary magnetic flux vector.

Formula 2:

$$|\phi_s| = \phi_{ds} = \frac{1}{s}(v_{ds} - R_s i_{ds}) \quad (2)$$

The frequency $\omega_s$ of the primary magnetic flux vector is represented by the following expression (3). With the configuration of FIG. 3, the estimator 2 performs calculation shown in the expression (3) using the voltage command values and the current detection values to estimate the frequency $\omega_s$ of the primary magnetic flux vector.

Formula 3:

$$\omega_s = \frac{v_{qs} - R_s i_{qs}}{|\phi_s|} \quad (3)$$

A phase $\theta_s$ of the primary magnetic flux vector is represented by the following expression (4). With the configuration of FIG. 3, the estimator 2 performs calculation shown in the expression (4) using the voltage command values and the current detection values to estimate the phase $\theta_s$ of the primary magnetic flux vector.

Formula 4:

$$\theta_s = \frac{1}{s}\omega_s \quad (4)$$

The estimator 2 outputs the magnetic-flux estimation value $|\phi\hat{}|$ which is an estimation value $|\phi_s\hat{}|$ of the amplitude of the primary magnetic flux vector. The estimator 2 outputs the frequency estimation value $\omega\hat{}$ that is an estimation value $\omega_s\hat{}$ of the frequency of the primary magnetic flux vector. The estimator 2 outputs the phase estimation value $\theta\hat{}$ that is an estimation value $\hat{\theta}_s$ of the phase of the primary magnetic flux vector. Note that, in the calculation for estimating a magnetic flux in the estimator 2, a term for correcting a voltage error of the power converter 11 may be included in a term of the voltage command value.

Figure 4:
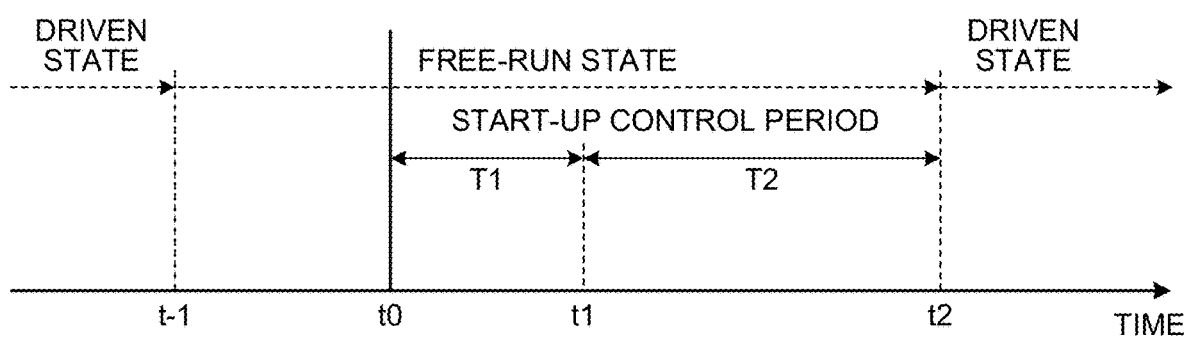
FIG. 4 is a diagram for describing operation in a start-up control period of the rotary machine control apparatus according to the first embodiment.

Next, a description will be given for an operation of the rotary machine control apparatus 20 in the start-up control period. FIG. 4 is a diagram for describing an operation of the rotary machine control apparatus 20 according to the first embodiment in the start-up control period. The horizontal axis represents time in FIG. 4. FIG. 4 illustrates transition between states of the rotary machine control apparatus 20 and details of the start-up control period.

The driving state refers to a state in which the synchronous machine 21 is driven under normal control performed by the rotary machine control apparatus 20. On the time axis illustrated in FIG. 4, the state of the synchronous machine 21 transitions from a driven state to a free-run state, and returns to a driven state again.

A start point of time of the start-up control period is defined as t0. At t−1 that is prior to t0, electric power supply to the synchronous machine 21 from the power converter 11 is shunt off, and then the synchronous machine 21 transitions from the driven state to the free-run state. The start-up control period includes the current control period T1 and the magnetic-flux control period T2. In the current control period T1, current control is performed based on the d-axis current command value $i_d^*$ that is a default command value. In the magnetic-flux control period T2, current control is performed based on the d-axis excitation current command value outputted by the magnetic flux controller 35. The current control period T1 is a period from t0 to t1. The magnetic-flux control period T2 is a period from t1 to t2 that is an end point of time at which the start-up control period ends. At t2, the synchronous machine 21 transitions from the free-run state to the driven state.

At t0, information on the current control period T1 is inputted to the switching unit 34. The switching unit 34 selects the d-axis current command value $i_d^*$ according to the information on the current control period T1. In the current control period T1, the switching unit 34 outputs the ds-axis current command value $i_{ds}^*$ that is derived from the d-axis current command value $i_d^*$. The d-axis current command value $i_d^*$ is a value indicating a minute excitation current. The rotary machine control apparatus 20 causes a magnetic flux to be generated in the synchronous machine 21 by flowing a minute excitation current through the synchronous machine 21 in the current control period T1. The current control period T1 is a preliminary operation period for smoothly starting up magnetic flux control in the magnetic-flux control period T2 following the current control period T1. Therefore, in the start-up control period, the magnetic-flux control period T2 is basically set to a period longer than the current control period T1.

Meanwhile, at t1, information on the magnetic-flux control period T2 is inputted to the switching unit 34. The switching unit 34 selects the d-axis excitation current command value outputted by the magnetic flux controller 35, according to the information on the magnetic-flux control period T2. The switching unit 34 outputs the ds-axis current command value $i_{ds}^*$ that is the d-axis excitation current command value outputted by the magnetic flux controller 35.

The phase estimation value $\hat{\theta}$ obtained by the estimator 2 in the start-up control period is used as an initial value of a phase in normal control from t2. The frequency estimation value $\hat{\omega}$ obtained by the estimator 2 in the start-up control period is used as an initial value of frequency in the normal control from t2. When the synchronous machine 21 returns to the driven state at t2, the synchronous machine 21 is controlled by an arbitrary method. Any publicly known method for vector control can be adopted as a method for controlling the synchronous machine 21 in the driven state. In this part, description for control of the synchronous machine 21 in the driven state is omitted. Normal control in the driven state may be implemented by a configuration inside the rotary machine control apparatus 20, or may be implemented by a configuration external to the rotary machine control apparatus 20.

The first embodiment is based on the assumption that the phase estimation value $\hat{\theta}$ and the frequency estimation value $\hat{\omega}$ are of phase and frequency of the primary magnetic flux vector, respectively. Since the synchronous machine 21 has no load in the free-run state, the direction of the primary magnetic flux vector is the same as the direction of a secondary magnetic flux vector in the free-run state. Therefore, even in a case where a control system based on the secondary magnetic flux vector is adopted for the control in the driven state, no problem is caused even if the phase estimation value $\hat{\theta}$ and the frequency estimation value $\hat{\omega}$ for the primary magnetic flux vector are used as initial values at a moment when the free-run state is changed to the driven state.

In the conventional technique disclosed in Patent Literature 1, the entire start-up control period is set as an electric current control period. In this case, in order to reduce generation of excessive torque, occurrence of pulsation, and an increase in DC bus voltage as much as possible, there is no choice but to set, as a current command value, a value indicating a minute excitation current. In this case, a certain time constant is required until an estimated phase or frequency becomes stable, so that the start-up control period becomes longer. In addition, since a magnetic flux to be excited by a minute current is small, a phase and a frequency to be obtained from the magnetic flux vector of the synchronous machine 21 or from an induced voltage generated by rotation of the magnetic flux vector are likely to be unstable due to influence such as disturbance. As the phase and the frequency become unstable, generation of unintended torque and pulsation of current or frequency are likely to occur. In addition, the DC bus voltage may increase.

According to the first embodiment, the current control period T1 is set before the magnetic-flux control period T2 in the start-up control period, and thereby the rotary machine control apparatus 20 can obtain the magnetic-flux estimation value $|\hat{\phi}|$ resulting from initial excitation, at the start point of time of the magnetic-flux control period T2. The rotary machine control apparatus 20 can start up magnetic flux control without causing a rapid change in magnetic flux, by performing magnetic flux control using the magnetic-flux estimation value $|\hat{\phi}|$ from the start point of time of the magnetic-flux control period T2. The rotary machine control apparatus 20 switches from the current control period T1 to the magnetic-flux control period T2 at an appropriate timing, and performs magnetic flux control using the magnetic-flux estimation value $|\hat{\phi}|$ from the start point of time of the magnetic-flux control period T2, so that the magnetic flux vector can be a larger value at an early stage and the magnetic flux vector can be stabilized at an early stage.

Furthermore, according to the first embodiment, the rotary machine control apparatus 20 can set the magnetic flux vector to a larger value at an early stage, and can stabilize the magnetic flux vector at an early stage, by using the d-axis excitation current command value outputted by the magnetic flux controller 35 in the magnetic-flux control period T2. Therefore, the rotary machine control apparatus 20 can shorten a length of time until the estimated phase and frequency are made sufficiently stable. As a result, the synchronous machine 21 can transition from the free-run state to the driven state by virtue of a short start-up control period. Furthermore, the synchronous machine 21 can reduce variations in phase and frequency resulting from disturbance or the like. Earlier stabilization of the phase and frequency enables reduction of unintended torque generation and current or frequency pulsation. In addition, the rotary machine control apparatus 20 can reduce an increase in the DC bus voltage.

As described above, the rotary machine control apparatus 20 has an advantageous effect of enabling reduction of the time required for the start-up of the rotary machine from its free-run state and reduction of unintended torque generation and occurrence of current or frequency pulsation.

Second Embodiment

In the first embodiment, an example of obtaining the magnetic-flux estimation value |φ^| from the primary magnetic flux of the d-axis and the primary magnetic flux of the q-axis has been described. In a second embodiment, an example of obtaining the magnetic-flux estimation value |φ^| from a primary magnetic flux of the α-axis and a primary magnetic flux of the β-axis will be described.

Figure 5:
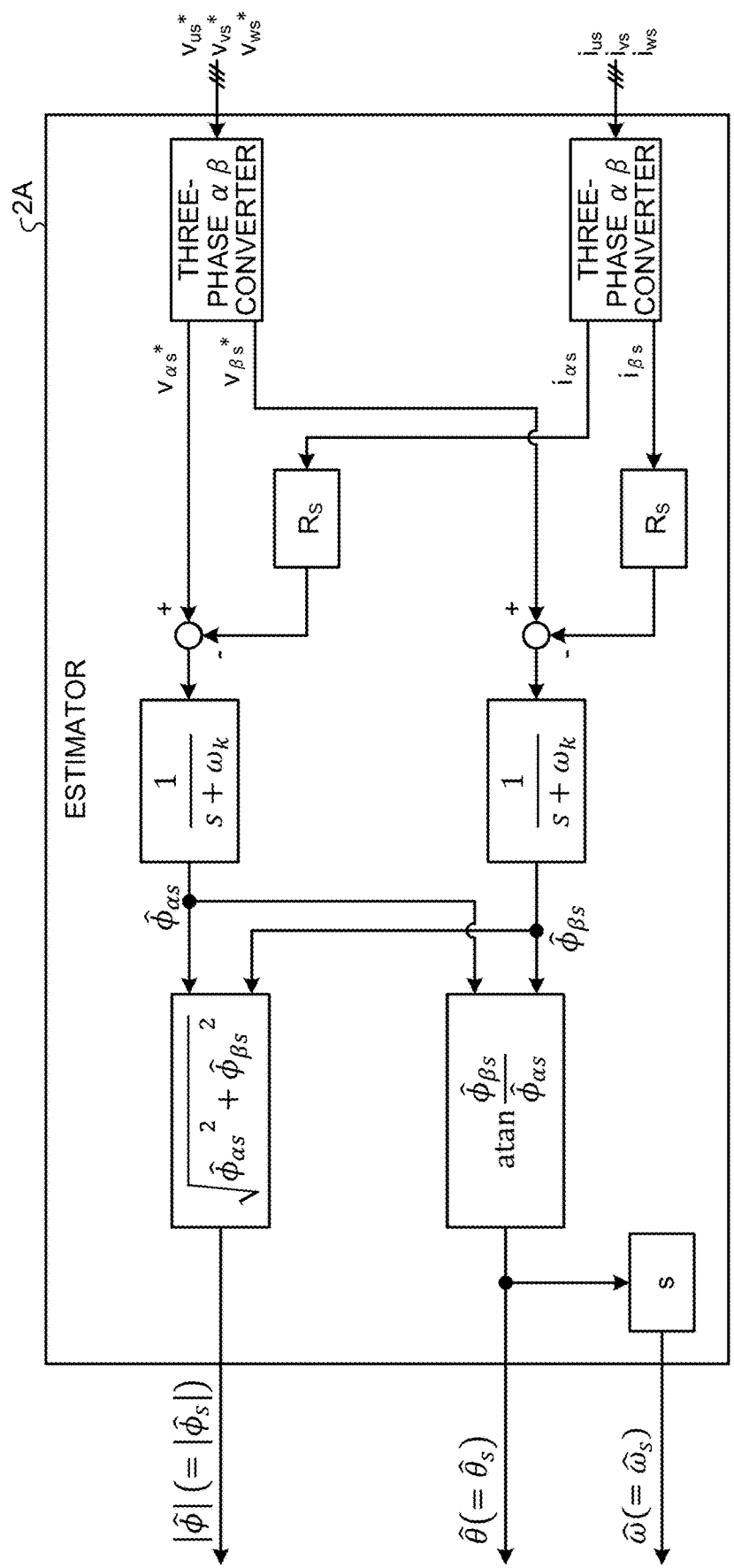
FIG. 5 is a diagram showing a configuration example of an estimator included in a rotary machine control apparatus according to a second embodiment.

FIG. 5 is a diagram showing a configuration example of an estimator 2A included in the rotary machine control apparatus 20 according to the second embodiment. A configuration of the rotary machine control apparatus 20 according to the second embodiment is much the same as that of the rotary machine control apparatus 20 according to the first embodiment except for the estimator 2A. In the second embodiment, description overlapping with the description of the first embodiment above will be omitted.

The rotary machine control apparatus 20 according to the second embodiment synchronizes a control phase with the phase of a primary magnetic flux vector. An α-axis and a β-axis are represented as an αs-axis and a βs-axis, respectively, where coordinate transformation to fixed coordinates using a direction of the primary magnetic flux vector as the α-axis as a reference is performed using the phase of the primary magnetic flux vector. The αs-axis is an axis in the direction of the primary magnetic flux vector. The βs-axis is an axis in a direction orthogonal to the primary magnetic flux vector.

The voltage command values $v_{us}^*$, $v_{vs}^*$, and $v_{ws}^*$ and the current detection values $i_{us}$, $i_{vs}$, and $i_{ws}$ are inputted to the estimator 2A. One of two three-phase αβ converters in the estimator 2A outputs an αs-axis voltage command value $v_{αs}^*$ and a βs-axis voltage command value $v_{βs}^*$ by coordinate transformation of the voltage command values $v_{us}^*$, $v_{vs}^*$, and $v_{ws}^*$. The other of the two three-phase αβ converters in the estimator 2A outputs an αs-axis current detection value $i_{αs}$ and a βs-axis current detection value $i_{βs}$ by coordinate transformation of the current detection values $i_{us}$, $i_{vs}$, and $i_{ws}$.

The following expression (5) is an expression representing the above expression (1) on the α-axis and the β-axis. Note that $v_{αs}$ denotes an αs-axis primary voltage, $v_{βs}$ denotes a βs-axis primary voltage, $i_{αs}$ denotes an αs-axis primary current, $i_{βs}$ denotes a βs-axis primary current, $φ_{αs}$ denotes an αs-axis primary magnetic flux, and $φ_{βs}$ denotes a βs-axis primary magnetic flux.

Formula 5:

$$\begin{bmatrix} v_{αs} \\ v_{βs} \end{bmatrix} = R_s \begin{bmatrix} i_{αs} \\ i_{βs} \end{bmatrix} + s \begin{bmatrix} φ_{αs} \\ φ_{βs} \end{bmatrix} \quad (5)$$

On the basis of the expression (5), the αs-axis primary magnetic flux $φ_{αs}$ and the βs-axis primary magnetic flux $φ_{βs}$ are represented by the following expression (6).

Formula 6:

$$\begin{bmatrix} φ_{αs} \\ φ_{βs} \end{bmatrix} = \frac{1}{s}\begin{bmatrix} v_{αs} \\ v_{βs} \end{bmatrix} + R_s \begin{bmatrix} i_{αs} \\ i_{βs} \end{bmatrix} \quad (6)$$

Unlike the above expression (2), the calculation shown in the expression (6) is integration of alternating quantity. Therefore, in order to avoid accumulation of an error of a DC component such as a detection offset, the calculation may be combined with a process of a high-pass filter having a cutoff frequency of $ω_k$. The cutoff frequency $ω_k$ has a value smaller than the frequency estimation value $ω^$, and is determined by multiplication of the frequency estimation value $ω^$ by a constant. The value of the constant is, for example, ⅓ or less.

Calculation into which the expression (6) is combined with a process of the high-pass filter is represented by the following expression (7). FIG. 5 shows a configuration example of the estimator 2A in a case of such combination with a process of the high-pass filter.

Formula 7:

$$\begin{bmatrix} φ_{αs} \\ φ_{βs} \end{bmatrix} = \frac{1}{s}\frac{s}{s+ω_k}\left(\begin{bmatrix} v_{αs} \\ v_{βs} \end{bmatrix} - R_s \begin{bmatrix} i_{αs} \\ i_{βs} \end{bmatrix}\right) \quad (7)$$

$$= \frac{s}{s+ω_k}\left(\begin{bmatrix} v_{αs} \\ v_{βs} \end{bmatrix} - R_s \begin{bmatrix} i_{αs} \\ i_{βs} \end{bmatrix}\right)$$

The amplitude |φ_s| of the primary magnetic flux vector is represented by the following expression (8). With the configuration of FIG. 5, the estimator 2A performs calculations shown in the expressions (7) and (8) on the basis of the voltage command values and the current detection values to estimate the amplitude |φ_s| of the primary magnetic flux vector. The estimator 2A may estimate the amplitude |φ_s| of the primary magnetic flux vector by performing the calculations shown in the expressions (6) and (8).

Formula 8:

$$|φ_s| = \sqrt{φ_{αs}^2 + φ_{βs}^2} \quad (8)$$

The phase $θ_s$ of the primary magnetic flux vector is represented by the following expression (9). With the configuration of FIG. 5, the estimator 2A performs calculations shown in the expressions (7) and (9) on the basis of the voltage command values and the current detection values to estimate the phase $θ_s$ of the primary magnetic flux vector. The estimator 2A may estimate the phase $θ_s$ of the primary magnetic flux vector by performing the calculations shown in the expressions (6) and (9).

Formula 9:

$$\theta_s = a\tan\frac{\phi_\beta}{\phi_\alpha} \quad (9)$$

The frequency $\omega_s$ of the primary magnetic flux vector is represented by the following expression (10). With the configuration of FIG. 5, the estimator 2A performs calculations shown in the expressions (7) and (10) on the basis of the voltage command values and the current detection values to estimate the frequency $\omega_s$ of the primary magnetic flux vector. The estimator 2A may estimate the frequency $\omega_s$ of the primary magnetic flux vector by performing the calculations shown in the expressions (6) and (10).

Formula 10:

$$\omega_s = s\theta_s \quad (10)$$

The estimator 2A outputs the magnetic-flux estimation value $|\hat{\phi}|$ that is the estimation value $|\hat{\phi_s}|$ of the amplitude of the primary magnetic flux vector. The estimator 2A outputs the frequency estimation value $\hat{\omega}$ that is the estimation value $\hat{\omega_s}$ of the frequency of the primary magnetic flux vector. The estimator 2A outputs the phase estimation value $\hat{\theta}$ that is the estimation value $\hat{\theta_s}$ of the phase of the primary magnetic flux vector. Note that, in the calculation for estimating a magnetic flux in the estimator 2A, a term for correcting a voltage error of the power converter 11 may be included in a term of the voltage command value.

Also in the second embodiment, the rotary machine control apparatus 20 has an advantageous effect of enabling reduction of the time required for the start-up of the rotary machine from the free-run state and enable reduction of unintended torque generation and occurrence of current or frequency pulsation, as in the first embodiment.

Third Embodiment

In the first and second embodiments, examples of obtaining the magnetic-flux estimation value $|\hat{\phi}|$ from the primary magnetic flux have been described. In a third embodiment, a description will be given of an example of obtaining the magnetic-flux estimation value $|\hat{\phi}|$ from a secondary magnetic flux.

Figure 6:
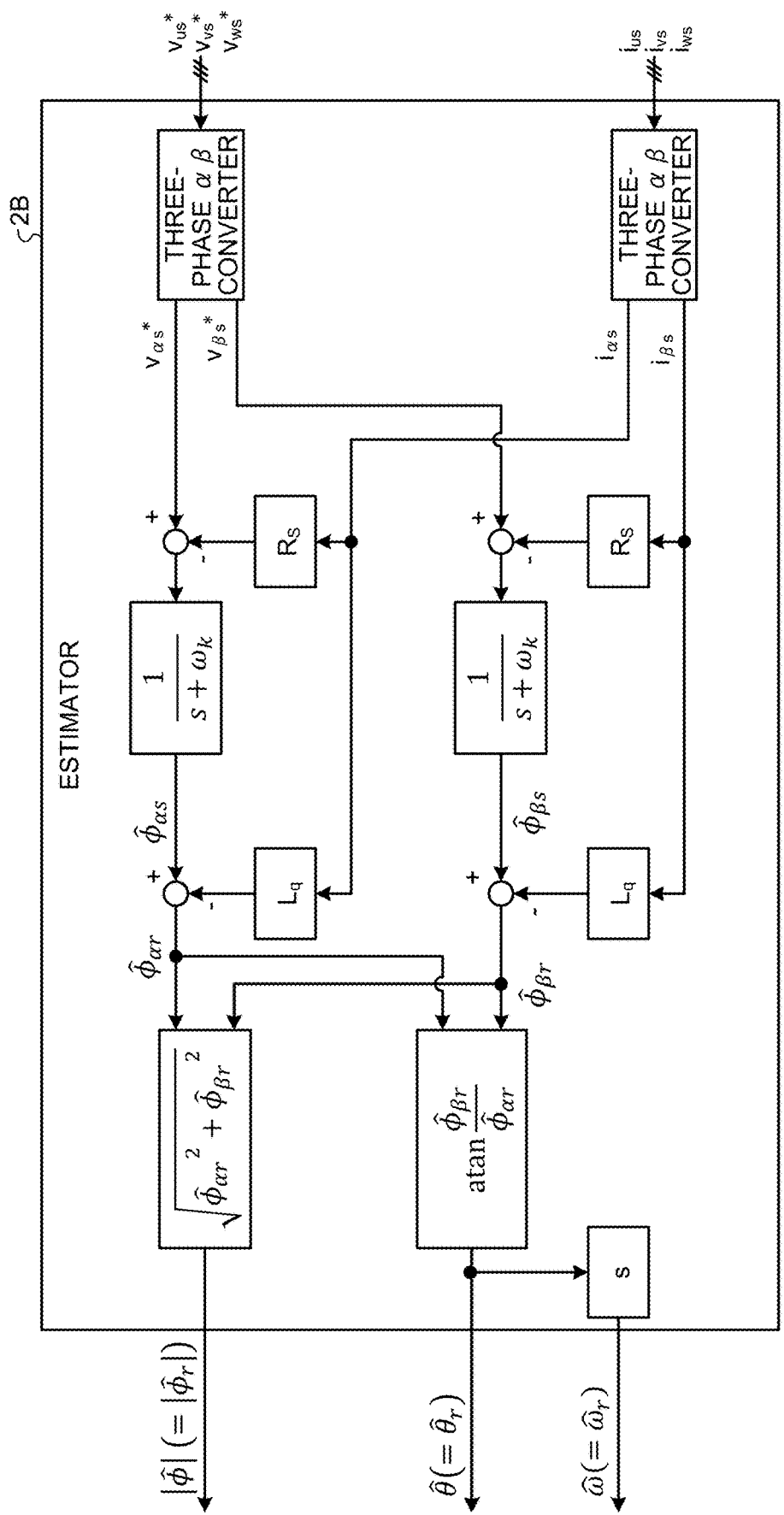
FIG. 6 is a diagram showing a configuration example of an estimator included in a rotary machine control apparatus according to a third embodiment.

FIG. 6 is a diagram showing a configuration example of an estimator 2B included in the rotary machine control apparatus 20 according to the third embodiment. A configuration of the rotary machine control apparatus 20 according to the third embodiment is much the same as that of the rotary machine control apparatus 20 according to the first embodiment except for the estimator 2B. In the third embodiment, description overlapping with the description of the first embodiment above will be omitted.

The rotary machine control apparatus 20 according to the third embodiment synchronizes a control phase with the phase of a secondary magnetic flux vector. An α-axis and a β-axis are represented as an αr-axis and a βr-axis, respectively, where coordinate transformation using a direction of the secondary magnetic flux vector as the α-axis as a reference is performed using the phase of the secondary magnetic flux vector. The αr-axis is an axis in the direction of the secondary magnetic flux vector. The βr-axis is an axis in a direction orthogonal to the secondary magnetic flux vector.

The voltage command values $v_{us}^*$, $v_{vs}^*$, and $v_{ws}^*$ and the current detection values $i_{us}$, $i_{vs}$, and $i_{ws}$ are inputted to the estimator 2B. One of two three-phase αβ converters in the estimator 2B outputs the αs-axis voltage command value $v_{\alpha s}^*$ and the βs-axis voltage command value $v_{\beta s}^*$ by coordinate transformation of the voltage command values $v_{us}^*$, $v_{vs}^*$, and $v_{ws}^*$. The other of the two three-phase αβ converters in the estimator 2B outputs the αs-axis current detection value $i_{\alpha s}$ and the βs-axis current detection value $i_{\beta s}$ by coordinate transformation of the current detection values $i_{us}$, $i_{vs}$, and $i_{ws}$.

FIG. 6 shows a configuration example of the estimator 2B in a case of combination with a process of a high-pass filter as in the second embodiment. Any method based on a publicly known technique can be used as a method for extracting components synchronized with the αr-axis and the βr-axis from a primary magnetic flux vector expressed by the expression (7).

The following expression (11) shows an example of a method for extracting components synchronized with the αr-axis and the βr-axis. In this example, αr-axis primary magnetic flux $\phi_{\alpha r}$ and βr-axis primary magnetic flux $\phi_{\beta r}$ are obtained by the expression (11). The symbol "$L_{qr}$" denotes an inductance of a qr-axis component. A d-axis and a q-axis are represented as a dr-axis and a qr-axis, respectively, where coordinate transformation to rotational coordinates using a direction of the secondary magnetic flux vector as the d-axis as a reference is performed. The method shown in the expression (11) is described in "I. Boldea, M. C. Paicu, and G. D. Andreescu, Active flux concept for motion-sensorless unified ac drives, IEEE Transactions on Power Electronics, Vol. 23, No. 5, pp. 2612-2618, 2008".

Formula 11:

$$\begin{bmatrix}\phi_{\alpha r}\\\phi_{\beta r}\end{bmatrix} = \begin{bmatrix}\phi_{\alpha s}\\\phi_{\beta s}\end{bmatrix} - L_{qr}\begin{bmatrix}i_{\alpha s}\\i_{\beta s}\end{bmatrix} \quad (11)$$

An amplitude $|\phi_r|$ of the secondary magnetic flux vector is represented by the following expression (12). With the configuration of FIG. 6, the estimator 2B estimates the amplitude $|\phi_r|$ of the secondary magnetic flux vector.

Formula 12:

$$|\phi_r| = \sqrt{\phi_{\alpha r}^2 + \phi_{\beta r}^2} \quad (12)$$

A phase $\theta_r$ of the secondary magnetic flux vector is represented by the following expression (13). With the configuration of FIG. 6, the estimator 2B estimates the phase Or of the secondary magnetic flux vector.

Formula 13:

$$\theta_r = a\tan\frac{\phi_{\beta r}}{\phi_{\alpha r}} \quad (13)$$

A frequency $\omega_r$ of the secondary magnetic flux vector is represented by the following expression (14). With the configuration of FIG. 6, the estimator 2B estimates the frequency $\omega_r$ of the secondary magnetic flux vector.

Formula 14:

$$\omega_r = s\theta_r \quad (14)$$

The estimator 2B outputs the magnetic-flux estimation value $|\hat{\phi}|$ that is an estimation value $|\hat{\phi_r}|$ of the amplitude of the secondary magnetic flux vector. The estimator 2B outputs the frequency estimation value $\hat{\omega}$ that is an estimation value $\omega_r\hat{}$ of the frequency of the secondary magnetic flux vector. The estimator 2B outputs the phase estimation value $\theta\hat{}$ that is an estimation value $\theta_r\hat{}$ of the phase of the secondary magnetic flux vector. Note that, in the calculation for estimating a magnetic flux in the estimator 2B, a term for correcting a voltage error of the power converter 11 may be included in a term of the voltage command value.

The third embodiment is based on the assumption that the phase estimation value $\theta\hat{}$ and the frequency estimation value $\omega\hat{}$ are of the phase and frequency of the secondary magnetic flux vector, respectively. Since the synchronous machine 21 has no load in the free-run state, the direction of the secondary magnetic flux vector is the same as the direction of the primary magnetic flux vector in the free-run state. Therefore, even in a case where a control method using the primary magnetic flux vector as a reference is adopted for control in the driven state, no problem is caused even if the phase estimation value $\theta\hat{}$ and the frequency estimation value $\omega\hat{}$ for the secondary magnetic flux vector are used as initial values at a moment when the synchronous machine 21 transitions from the free-run state to the driven state.

According to the third embodiment, as in the first embodiment, the rotary machine control apparatus 20 can shorten a time length taken until the estimated phase and frequency are made sufficiently stable. Therefore, the synchronous machine 21 can transition from the free-run state to the driven state by virtue of a short start-up control period. Furthermore, the synchronous machine 21 can reduce variations in phase and frequency resulting from disturbance or the like. Earlier stabilization of the phase and the frequency enables reduction of unintended torque generation and current or frequency pulsation. In addition, the rotary machine control apparatus 20 can reduce an increase in the DC bus voltage.

As described above, the rotary machine control apparatus 20 has an advantageous effect of enabling reduction of the time required for the start-up of the rotary machine from its free-run state and enabling reduction of unintended torque generation and occurrence of current or frequency pulsation.

Figure 7:
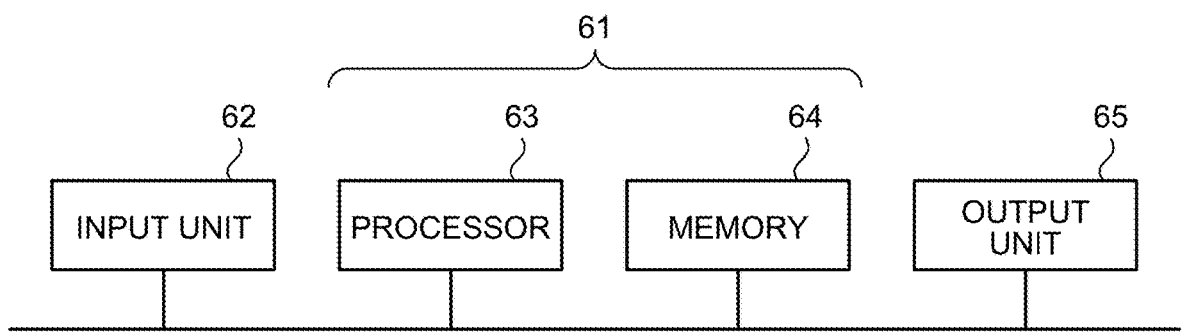
FIG. 7 is a diagram showing a configuration example of hardware that implements a voltage command unit of the rotary machine control apparatuses according to the first to third embodiments.

Next, a description will be given of a hardware configuration by which the voltage command unit 10 that is a main part of the rotary machine control apparatuses 20 according to the first to third embodiments is realized. FIG. 7 is a diagram showing a configuration example of hardware that implements each voltage command unit 10 of the rotary machine control apparatuses 20 according to the first to third embodiments. FIG. 7 shows a configuration example in which the controller 1 and the estimator 2, 2A, or 2B of the voltage command unit 10 are implemented by a processing circuit 61 including a processor 63 and a memory 64.

The processor 63 is a central processing unit (CPU). The processor 63 may be an arithmetic device, a microprocessor, a microcomputer, or a digital signal processor (DSP). Examples of the memory 64 include volatile or nonvolatile semiconductor memories such as a random access memory (RAM), a read only memory (ROM), a flash memory, an erasable programmable read only memory (EPROM), and an electrically erasable programmable read only memory (EEPROM) (registered trademark).

In the memory 64, a program configured to conduct operation for the controller 1 and the estimator 2, 2A, or 2B is stored. The controller 1 and the estimator 2, 2A, or 2B can be implemented by the processor 63 reading and executing the program. Note that the program configured to conduct the operation for the controller 1 and the estimator 2, 2A, or 2B, which is stored in the memory 64, may be written in a storage medium such as a compact disc ROM (CD-ROM) or a digital versatile disc ROM (DVD-ROM), and provided to a user or the like, or may be provided via a network. In addition, the processor 63 outputs data such as calculation results to a volatile memory of the memory 64. Alternatively, the processor 63 outputs the data such as calculation results to an auxiliary storage device via the volatile memory of the memory 64 to store the data in the auxiliary storage device.

An input unit 62 is a circuit that receives, from the outside, input signals for the voltage command unit 10. The input unit 62 receives the current detection values $i_{us}$, $i_{vs}$, and $i_{ws}$, information on the current control period T1, and information on the magnetic-flux control period T2. An output unit 65 is a circuit that outputs, to the outside, signals generated by the voltage command unit 10. The output unit 65 outputs the voltage command values $v_{us}^*$, $v_{vs}^*$, and $v_{ws}^*$.

FIG. 7 shows an example of hardware to be used in a case where the controller 1 and the estimator 2, 2A, or 2B are implemented by the processor 63 that is a general-purpose processor and the memory 64 that is a general-purpose memory. However, the controller 1 and the estimator 2, 2A, or 2B may be implemented by a dedicated processing circuit instead of the processor 63 and the memory 64. That is, the controller 1 and the estimator 2, 2A, or 2B may be implemented by a dedicated processing circuit. Here, the dedicated processing circuit refers to a single circuit, a composite circuit, an application specific integrated circuit (ASIC), a field programmable gate array (FPGA), or a circuit into which any of them are combined. Note that a part of the controller 1 and the estimator 2, 2A, or 2B may be implemented by the processor 63 and the memory 64, and the rest thereof may be implemented by a dedicated processing circuit.

Fourth Embodiment

In a fourth embodiment, a description will be given of a machine learning apparatus that generates a learned model for inferring the length of the current control period T1 and the length of the magnetic-flux control period T2.

Figure 8:
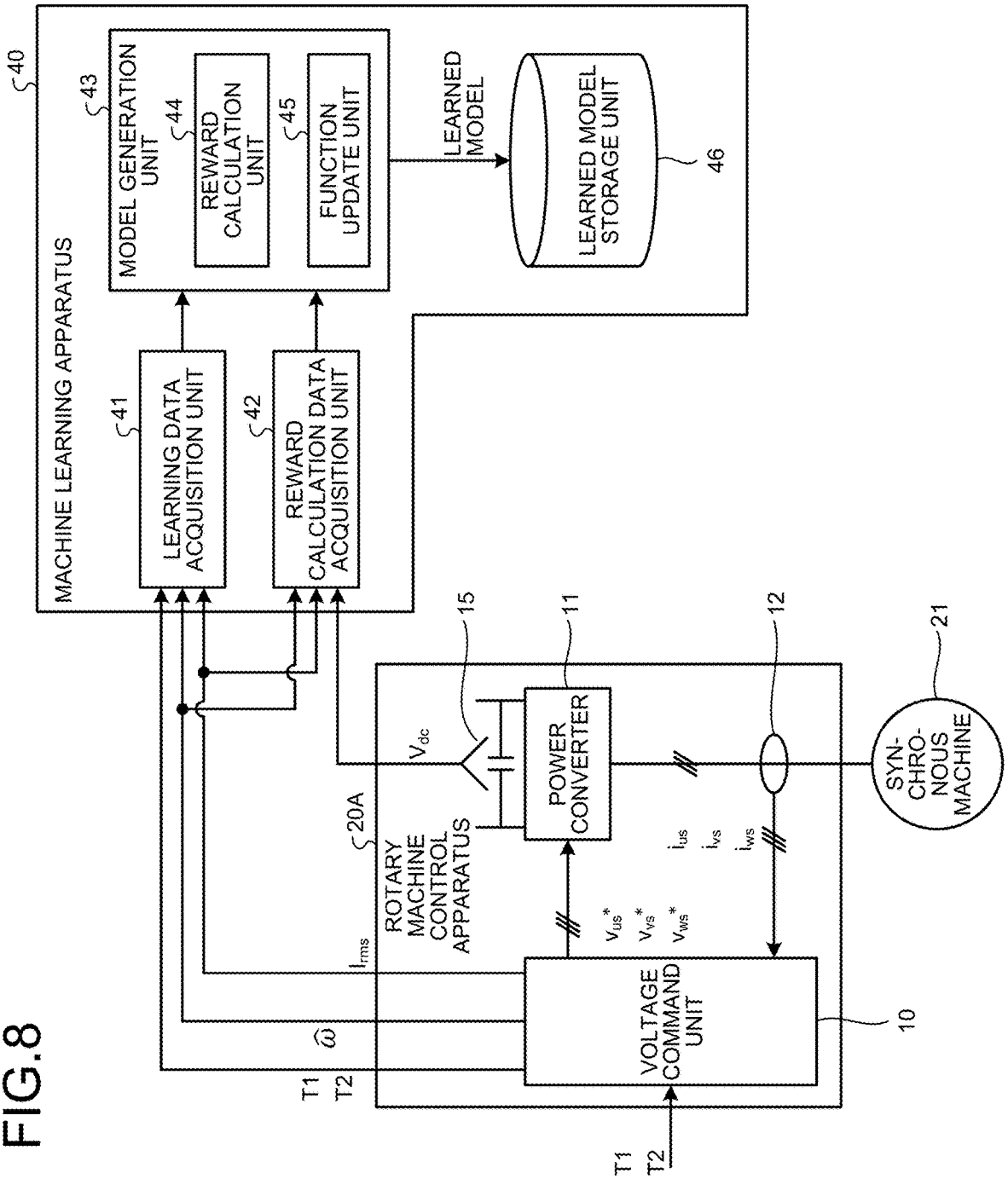
FIG. 8 is a diagram illustrating a machine learning apparatus and a rotary machine control apparatus according to a fourth embodiment.

FIG. 8 is a diagram illustrating a machine learning apparatus 40 and a rotary machine control apparatus 20A according to the fourth embodiment. In the fourth embodiment, the same constituent elements as those in the first to third embodiments are designated by the same reference symbols, and a configuration different from the configurations of the first to third embodiments will be mainly described. The machine learning apparatus 40 illustrated in FIG. 8 is provided outside the rotary machine control apparatus 20A.

A voltage detector 15 has been added to the rotary machine control apparatus 20 of any one of the first to third embodiments to realize the rotary machine control apparatus 20A. The voltage detector 15 detects a DC bus voltage of the power converter 11, and outputs a bus voltage detection value $V_{dc}$.

For the rotary machine control apparatus 20A, the machine learning apparatus 40 learns the length of the current control period T1 and the length of the magnetic-flux control period T2 that enable reduction of the amount of increase in the DC bus voltage in the power converter 11, reduction of the pulsation width of the DC bus voltage, reduction of the pulsation width of the frequency of a magnetic flux vector in the synchronous machine 21, and reduction of the pulsation width of an effective current value of an electric current flowing through the synchronous machine 21. The machine learning apparatus 40 includes a learning data acquisition unit 41, a reward calculation data acquisition unit 42, a model generation unit 43, and a learned model storage unit 46. Note that the machine learning apparatus 40 just needs to learn the length of the current control period T1 and the length of the magnetic-flux control period T2 that enable at least one of reduction of the amount of increase in the DC bus voltage, reduction of the pulsation width of the DC bus voltage, reduction of the pulsation width of the frequency of the magnetic flux vector, and reduction of the pulsation width of the effective current value.

The learning data acquisition unit 41 acquires, from the voltage command unit 10, a value indicating the length of the current control period T1, a value indicating the length of the magnetic-flux control period T2, the frequency estimation value $\hat{\omega}$, and an effective current value $I_{rms}$. Hereinafter, the value indicating the length of the current control period T1 is referred to as a value of the current control period T1. The value indicating the length of the magnetic-flux control period T2 is referred to as a value of the magnetic-flux control period T2. The learning data acquisition unit 41 acquires learning data that refers to the values of the current control period T1 and the magnetic-flux control period T2, the frequency estimation value $\hat{\omega}$, and the effective current value $I_{rms}$.

The effective current value $I_{rms}$ is an effective current value to be obtained from the current detection values $i_{us}$, $i_{vs}$, and $i_{ws}$, or an effective current value based on at least one of the current detection values $i_{us}$, $i_{vs}$, and $i_{ws}$. The three-phase dq converter 31 in the power converter 11 calculates the effective current value $I_{rms}$ from at least one of the current detection values $i_{us}$, $i_{vs}$, and $i_{ws}$. The learning data acquisition unit 41 acquires the effective current value $I_{rms}$ calculated by the three-phase dq converter 31. The three-phase dq converter 31 may be configured to calculate the effective current value $I_{rms}$ from the ds-axis primary current $i_{ds}$ or the qs-axis primary current $i_{qs}$.

Note that the present embodiment is based on the assumption that the effective current value $I_{rms}$ is calculated by the three-phase dq converter 31, but the present disclosure is not limited to this assumption. The effective current value $I_{rms}$ may be calculated by either an internal element of the rotary machine control apparatus 20A or an element external to the rotary machine control apparatus 20A. Alternatively, an internal element of the machine learning apparatus 40 may calculate the effective current value $I_{rms}$. In this case, the learning data acquisition unit 41 may acquire the current detection values $i_{us}$, $i_{vs}$, and $i_{ws}$, the ds-axis primary current $i_{ds}$, or the qs-axis primary current $i_{qs}$, and calculate the effective current value $I_{rms}$.

When the synchronous machine 21 is in the driven state, the learning data acquisition unit 41 operates to acquire the learning data responsively thereto. In addition, the learning data acquisition unit 41 creates a data set obtained by putting together pieces of learning data that are the values of the current control period T1 and the magnetic-flux control period T2, the frequency estimation value $\hat{\omega}$, and the effective current value $I_{rms}$. The learning data acquisition unit 41 sends the created data set to the model generation unit 43.

The reward calculation data acquisition unit 42 acquires the frequency estimation value $\hat{\omega}$ and the effective current value $I_{rms}$ from the voltage command unit 10. The reward calculation data acquisition unit 42 acquires the bus voltage detection value $V_{dc}$ from the voltage detector 15. The reward calculation data acquisition unit 42 operates from when the synchronous machine 21 is in the driven state to when the synchronous machine 21 is in the free-run state.

When the synchronous machine 21 is in the driven state, the reward calculation data acquisition unit 42 acquires the frequency estimation value $\hat{\omega}$, the effective current value $I_{rms}$, and the bus voltage detection value $V_{dc}$. The reward calculation data acquisition unit 42 obtains a pulsation width $V_{dc\_}$rip of the bus voltage detection value $V_{dc}$ from the acquired bus voltage detection value $V_{dc}$. The pulsation width $V_{dc\_}$rip refers to an amplitude of a waveform indicating time-series variation of the bus voltage detection value $V_{dc}$.

The reward calculation data acquisition unit 42 obtains a pulsation width $\hat{\omega}\_$rip of the frequency estimation value $\hat{\omega}$ from the acquired frequency estimation value $\hat{\omega}$. The pulsation width $\hat{\omega}\_$rip refers to an amplitude of a waveform indicating time-series variation of the frequency estimation value $\hat{\omega}$. The reward calculation data acquisition unit 42 obtains a pulsation width $I_{rms\_}$rip of the effective current value $I_{rms}$ from the acquired effective current value $I_{rms}$. The pulsation width $I_{rms\_}$rip refers to an amplitude of a waveform indicating time-series variation of the effective current value $I_{rms}$. The pulsation widths $V_{dc\_}$rip, $\hat{\omega}\_$rip, and $I_{rms\_}$rip are absolute values.

The reward calculation data acquisition unit 42 extracts the pulsation widths $V_{dc\_}$rip, $\hat{\omega}\_$rip, and $I_{rms\_}$rip from the bus voltage detection value $V_{dc}$, the frequency estimation value $\hat{\omega}$, and the effective current value $I_{rms}$, respectively, using an arbitrary filtering method such as a high-pass filter. As a result, the reward calculation data acquisition unit 42 obtains the pulsation widths $V_{dc\_}$rip, $\hat{\omega}\_$rip, and $I_{rms\_}$rip.

The reward calculation data acquisition unit 42 stores the bus voltage detection value $V_{dc}$ and the pulsation widths $V_{dc\_}$rip, $\hat{\omega}\_$rip, and $I_{rms\_}$rip. The reward calculation data acquisition unit 42 stores reward calculation data at a preset timing while the synchronous machine 21 is in the driven state. The reward calculation data acquisition unit 42 may acquire the bus voltage detection value $V_{dc}$ and the pulsation widths $V_{dc\_}$rip, $\hat{\omega}\_$rip, and $I_{rms\_}$rip at more than one timing, and store their respective average values of the acquired data. Hereinafter, the bus voltage detection value $V_{dc}$ and the pulsation widths $V_{dc\_}$rip, $\hat{\omega}\_$rip, and $I_{rms\_}$rip stored in the reward calculation data acquisition unit 42 are represented as $V_{dc\_}$drv, $V_{dc\_}$rip_drv, $\hat{\omega}\_$rip_drv, and $I_{rms\_}$rip_drv, respectively.

In addition, the reward calculation data acquisition unit 42 acquires the frequency estimation value $\hat{\omega}$, the effective current value $I_{rms}$, and the bus voltage detection value $V_{dc}$ in the start-up control period in which the synchronous machine 21 is in the free-run state. The reward calculation data acquisition unit 42 obtains a maximum value $V_{dc\_}$rstmax of the bus voltage detection value $V_{dc}$ in the start-up control period. The reward calculation data acquisition unit 42 obtains, from the acquired bus voltage detection value $V_{dc}$, a maximum value $V_{dc\_}$rip_rstmax of the pulsation width of the bus voltage detection value $V_{dc}$ in the start-up control period by using an arbitrary filtering method such as a high-pass filter. The reward calculation data acquisition unit 42 obtains, from the acquired frequency estimation value $\hat{\omega}$, a maximum value $\hat{\omega}\_$rip_rstmax of the pulsation width of the frequency estimation value $\hat{\omega}$ in the start-up control period by using an arbitrary filtering method such as a high-pass filter. The reward calculation data acquisition unit 42 obtains, from the acquired effective current value $I_{rms}$, a maximum value $I_{rms\_}$rip_rstmax of the pulsation width of the effective current value $I_{rms}$ in the start-up control period by using an arbitrary filtering method such as a high-pass filter.

Furthermore, the reward calculation data acquisition unit 42 obtains an increase amount $V_{dc}$_rip_dat of the pulsation width $V_{dc}$_rip, an increase amount $\hat{\omega}$_rip_dat of the pulsation width $\hat{\omega}$_rip, an increase amount $I_{rms}$_rip_dat of the pulsation width $I_{rms}$_rip, and an increase amount $V_{dc}$_dat of the bus voltage detection value $V_{dc}$. The increase amounts $V_{dc}$_rip_dat, $\hat{\omega}$_rip_dat, $I_{rms}$_rip_dat, and $V_{dc}$_dat refer to their respective amounts of increase with respect to those at the time of the synchronous machine 21 being in the driven state.

The reward calculation data acquisition unit 42 obtains the increase amount $V_{dc}$_rip_dat by calculation shown in the following expression (15).

$$V_{dc}\_rip\_dat = V_{dc}\_rip\_rstmax - V_{dc}\_rip\_drv \quad (15)$$

The reward calculation data acquisition unit 42 obtains the increase amount $\hat{\omega}$_rip_dat by calculation shown in the following expression (16).

$$\hat{\omega}\_rip\_dat = \hat{\omega}\_rip\_rstmax - \hat{\omega}\_rip\_drv \quad (16)$$

The reward calculation data acquisition unit 42 obtains the increase amount $I_{rms}$_rip_dat by performing calculation shown in formula (17) below.

$$I_{rms}\_rip\_dat = I_{rms}\_rip\_rstmax - I_{rms}\_rip\_drv \quad (17)$$

The reward calculation data acquisition unit 42 obtains the increase amount $V_{dc}$_dat by calculation shown in the following expression (18).

$$V_{dc}\_dat = V_{dc}\_rstmax - V_{dc}\_drv \quad (18)$$

The reward calculation data acquisition unit 42 sends the increase amounts $V_{dc}$_rip_dat, $\hat{\omega}$_rip_dat, $I_{rms}$_rip_dat, and $V_{dc}$_dat, which are reward calculation data, to the model generation unit 43.

The model generation unit 43 generates a learned model with use of a data set produced based on the values on the current control period T1 and the magnetic-flux control period T2, the frequency estimation value $\hat{\omega}$, and the effective current value $I_{rms}$. The model generation unit 43 generates a learned model for inferring, from the frequency estimation value $\hat{\omega}$ and the effective current value $I_{rms}$, the length of the current control period T1 and the length of the magnetic-flux control period T2 that enable reduction of the amount of increase in the DC bus voltage in the power converter 11, reduction of the pulsation width of the DC bus voltage, reduction of the pulsation width of the frequency of a magnetic flux vector in the synchronous machine 21, and reduction of the pulsation width of the effective current value $I_{rms}$ of an electric current flowing through the synchronous machine 21.

Note that the model generation unit 43 just needs to generate a learned model for inferring the length of the current control period T1 and the length of the magnetic-flux control period T2 that enable at least one of reduction of the amount of increase in the DC bus voltage, reduction of the pulsation width of the DC bus voltage, reduction of the pulsation width of the frequency of the magnetic flux vector, and reduction of the pulsation width of the effective current value $I_{rms}$. The reward calculation data may be at least one of the increase amount $V_{dc}$_rip_dat, the increase amount $\hat{\omega}$_rip_dat, the increase amount $I_{rms}$_rip_dat, and the increase amount $V_{dc}$_dat. In the case of seeking to reduce the pulsation width of the DC bus voltage, the increase amount $V_{dc}$_rip_dat is included in the reward calculation data. In the case of seeking to reduce the pulsation width of the frequency of the magnetic flux vector, the increase amount $\hat{\omega}$_rip_dat is included in the reward calculation data. In the case of seeking to reduce the pulsation width of the effective current value $I_{rms}$, the increase amount $I_{rms}$_rip_dat is included in the reward calculation data. In the case of seeking to reduce the amount of increase in DC bus voltage, the increase amount $V_{dc}$_dat is included in the reward calculation data.

A publicly known algorithm for supervised learning, unsupervised learning, reinforcement learning or the like can be used as a learning algorithm used by the model generation unit 43. A case where reinforcement learning is applied will be described as an example. In reinforcement learning, an action subject that is an agent in a certain environment observes a present state, and determines an action to be taken. The agent obtains a reward from the environment by selecting an action, and learns a measure such that the highest reward can be gained through a series of actions. Q-learning, TD-learning, and the like are known as typical methods for reinforcement learning. For example, in the case of Q-learning, an action value table that is a general update expression of an action value function Q(s, a) is represented by the following expression (19). The action value function Q(s, a) represents an action value Q that is a value of an action when an action "a" is selected under an environment "s".

Formula 15:

$$Q(s_t, a_t) \leftarrow Q(s_t, a_t) + \alpha(r_{t+1} + \gamma \max_a Q(s_{t+1}, a_t) - Q(s_t, a_t)) \quad \text{(Formula 19)}$$

The symbol "$s_t$" denotes the state of the environment at a time "t". The symbol "$a_t$" denotes an action taken at the time "t". The action "$a_t$" causes the state to be changed from "$s_t$" to "$s_{t+1}$" The symbol "$r_{t+1}$" denotes a reward to be gained by the change of the state from "$s_t$" to "$s_{t+1}$" The symbol "γ" denotes a discount rate, and satisfies a condition, i.e., 0<γ≤1. The symbol "α" denotes a learning coefficient, and satisfies a condition, i.e., 0<α≤1. In the fourth embodiment, the action "$a_t$" corresponds to the values of the current control period T1 and the magnetic-flux control period T2. The state "$s_t$" corresponds to the frequency estimation value $\hat{\omega}$ and the effective current value $I_{rms}$. The model generation unit 43 learns a best action "$a_t$" in the state "$s_t$" at the time "t".

The update expression represented by the expression (19) above increases the action value Q if the action value of the best action "a" taken at the time t+1 is larger than the action value Q of the action "a" taken at the time "t", but decreases the action value Q in the opposite case. In other words, the action value function Q(s, a) is updated so that the action value Q of the action "a" at the time "t" approaches the best action value at a time "t+1". As a result, the best action value in a certain environment sequentially propagates to action values in environments previous thereto.

The model generation unit 43 includes a reward calculation unit 44 and a function update unit 45. The reward calculation unit 44 calculates a reward for a combination of the respective values of the current control period T1 and the magnetic-flux control period T2, the frequency estimation value $\hat{\omega}$, and the effective current value $I_{rms}$ on the basis of the increase amounts $V_{dc}$_rip_dat, $\hat{\omega}$_rip_dat, $I_{rms}$_rip_dat, and $V_{dc}$_dat. The function update unit 45 updates a function for obtaining the respective values of the current control period T1 and the magnetic-flux control period T2 from the frequency estimation value $\hat{\omega}$ and the effective current value $I_{rms}$, in accordance with the reward. The function update unit 45 outputs, to the learned model storage unit 46, a learned model produced by the update of the function. The learned model storage unit 46 stores the learned model.

The reward calculation unit 44 calculates a reward "r" based on the respective values of the current control period T1 and the magnetic-flux control period T2, the frequency estimation value ω^, the effective current value $I_{rms}$, and the increase amounts $V_{dc}$_rip_dat, ω^_rip_dat, $I_{rms}$_rip_dat, and $V_{dc}$_dat. For example, in a case where at least one of the increase amounts $V_{dc}$_rip_dat, ω^_rip_dat, $I_{rms}$_rip_dat, and $V_{dc}$_dat decreases as a result of change of the value of the current control period T1 or the value of the magnetic-flux control period T2, the reward calculation unit 44 increases the reward "r". The reward calculation unit 44 increases the reward "r" by providing "1" that is a value for reward. Note that the value for reward is not limited to "1".

Meanwhile, in a case where at least one of the increase amounts $V_{dc}$_rip_dat, ω^_rip_dat, $I_{rms}$_rip_dat, and $V_{dc}$_dat increases as a result of change of the value of the current control period T1 or the value of the magnetic-flux control period T2, the reward calculation unit 44 decreases the reward "r". The reward calculation unit 44 decreases the reward "r" by providing "−1" that is another value for reward. Note that the value for reward is not limited to "−1".

The reward calculation data can be sifted according to an installation environment of the synchronous machine 21 or the like. The increase amounts $V_{dc}$_rip_dat, ω^_rip_dat, and $I_{rms}$_rip_dat may be omitted as appropriate when the pulsation widths are sufficiently below their respective demand criteria for the system and thus any measures to reduce the pulsation widths are unnecessary.

The function update unit 45 updates a function for determining the respective values of the current control period T1 and the magnetic-flux control period T2, according to the reward calculated by the reward calculation unit 44. The machine learning apparatus 40 repeatedly performs the learning described above. The function update unit 45 outputs, to the learned model storage unit 46, a learned model produced by the update of the function.

For example, in the case of Q-learning, the machine learning apparatus 40 uses the action value function $Q(s_t, a_t)$ represented by the above expression (19) as a function for determining the respective values of the current control period T1 and the magnetic-flux control period T2. The learned model storage unit 46 stores the action-value function $Q(s_t, a_t)$ updated by the function update unit 45, that is, a learned model.

Figure 9:
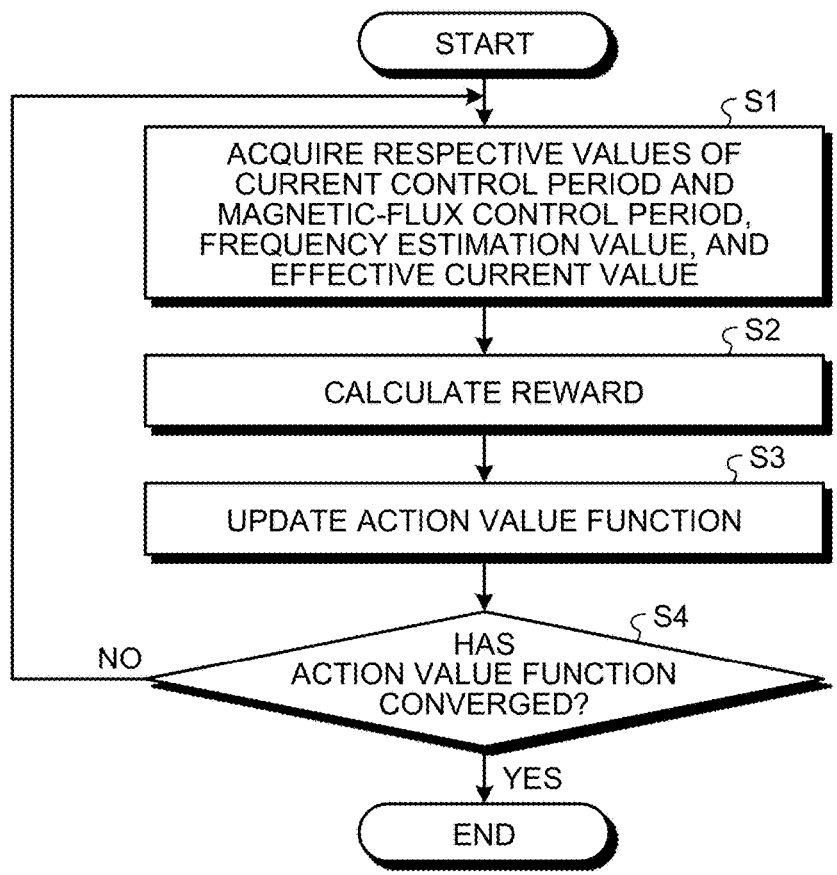
FIG. 9 is a flowchart illustrating a processing procedure of the machine learning apparatus according to the fourth embodiment.

FIG. 9 is a flowchart illustrating a processing procedure of the machine learning apparatus 40 according to the fourth embodiment. A reinforcement learning method for updating the action value function Q(s, a) will be described with reference to the flowchart of FIG. 9.

In step S1, the learning data acquisition unit 41 in the machine learning apparatus 40 acquires the respective values of the current control period T1 and the magnetic-flux control period T2, the frequency estimation value ω^, and the effective current value $I_{rms}$. That is, the machine learning apparatus 40 acquires learning data. In addition, the machine learning apparatus 40 obtains the increase amounts $V_{dc}$_rip_dat, ω^_rip_dat, $I_{rms}$_rip_dat, and $V_{dc}$_dat that are reward calculation data, as a result of calculation of the reward calculation data acquisition unit 42.

In step S2, the reward calculation unit 44 in the machine learning apparatus 40 calculates a reward. The reward calculation unit 44 calculates a reward for a combination of the respective values of the current control period T1 and the magnetic-flux control period T2, the frequency estimation value ω^, and the effective current value $I_{rms}$. The reward calculation unit 44 increases or decreases the reward on the basis of a result of comparison between the acquired or obtained reward calculation data and immediately previous reward calculation data.

In step S3, the machine learning apparatus 40 updates the action value function Q(s, a) on the basis of the reward calculated in step S2. The machine learning apparatus 40 updates the action value function $Q(s_t, a_t)$ stored in the learned model storage unit 46.

In step S4, the machine learning apparatus 40 determines whether or not the action value function Q(s, a) has converged. The machine learning apparatus 40 determines that the action value function Q(s, a) has converged as the action value function Q(s, a) is no longer updated in step S3.

When it is determined that the action value function Q(s, a) has not converged (step S4, No), the machine learning apparatus 40 returns the procedure to step S1. When it is determined that the action value function Q(s, a) has converged (step S4, Yes), the machine learning apparatus 40 ends the learning based on the procedure illustrated in FIG. 9. Note that the machine learning apparatus 40 may continue the learning by returning the procedure from step S3 to step S1 without making a determination of step S4. The learned model storage unit 46 stores a learned model that is the action value function Q(s, a) having been generated.

In the fourth embodiment, description has been given for a case where reinforcement learning is applied to the learning algorithm to be used by the machine learning apparatus 40, but some learning other than reinforcement learning may be applied to the learning algorithm. The machine learning apparatus 40 may perform machine learning using a publicly known learning algorithm other than the reinforcement learning, that is for example, deep learning, a neural network, genetic programming, inductive logic programming, or a support vector machine.

The machine learning apparatus 40 illustrated in FIG. 8 is provided outside the rotary machine control apparatus 20A. The machine learning apparatus 40 may be an apparatus built into the rotary machine control apparatus 20A. The machine learning apparatus 40 may be an apparatus connectable to the rotary machine control apparatus 20A via a network. The machine learning apparatus 40 may be an apparatus existing on a cloud server.

The machine learning apparatus 40 may learn the respective values of the current control period T1 and the magnetic-flux control period T2 according to data sets produced for two or more rotary machine control apparatuses 20A. The machine learning apparatus 40 may acquire learning data from a plurality of rotary machine control apparatuses 20A that are used in the same place, or may acquire learning data from two or more rotary machine control apparatuses 20A that are used in their respective places different from each other. Learning data may be data collected from two or more rotary machine control apparatuses 20A that operate independently of each other in their respective places. After collection of learning data from the rotary machine control apparatuses 20A is started, a new rotary machine control apparatus 20A may be added to the objects from which learning data are collected. Furthermore, after collection of learning data from the rotary machine control apparatuses 20A is started, one or some of the rotary machine control apparatuses 20A may be excluded from the objects from which learning data are collected.

The machine learning apparatus 40 that has performed learning for one rotary machine control apparatus 20A may perform learning for another rotary machine control apparatus 20A than the one rotary machine control apparatus 20A. The machine learning apparatus 40 that performs learning for the other rotary machine control apparatus 20A can update a learned model based on relearning performed for the other rotary machine control apparatus 20A.

According to the fourth embodiment, the machine learning apparatus 40 generates a learned model for inferring the respective values of the current control period T1 and the magnetic-flux control period T2 from the frequency estimation value $\hat{\omega}$ and the effective current value $I_{rms}$. The machine learning apparatus 40 can generate a learned model for obtaining the respective values of the current control period T1 and the magnetic-flux control period T2 that enable reduction of the amount of increase in the DC bus voltage in the power converter 11, reduction of the pulsation width of the DC bus voltage, reduction of the pulsation width of the frequency of a magnetic flux vector in the synchronous machine 21, and reduction of the pulsation width of the effective current value $I_{rms}$ of an electric current flowing through the synchronous machine 21.

Fifth Embodiment

In a fifth embodiment, a description will be given of an inference apparatus that infers the length of the current control period T1 and the length of the magnetic-flux control period T2 using a learned model generated by the machine learning apparatus 40 according to the fourth embodiment.

Figure 10:
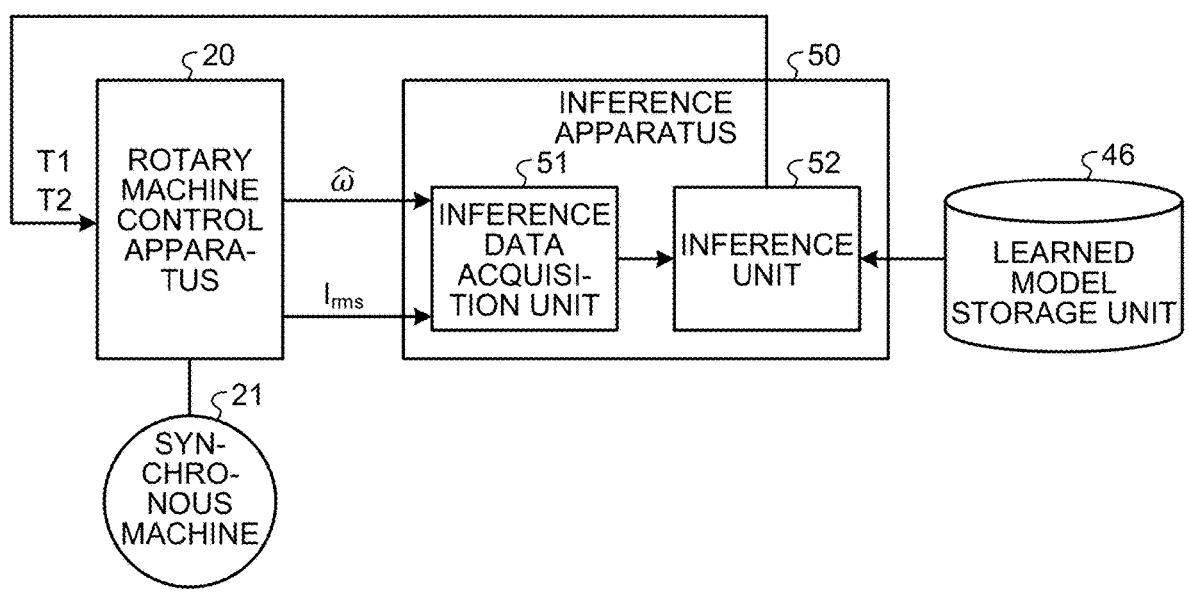
FIG. 10 is a diagram illustrating an inference apparatus and a rotary machine control apparatus according to a fifth embodiment.

FIG. 10 is a diagram illustrating an inference apparatus 50 and the rotary machine control apparatus 20 according to the fifth embodiment. In the fifth embodiment, the same constituent elements as those in the first to fourth embodiments are designated by the same reference symbols, and a configuration different from the configurations of the first to fourth embodiments will be mainly described. The inference apparatus 50 illustrated in FIG. 10 is provided outside the rotary machine control apparatus 20. Note that only the learned model storage unit 46 of the machine learning apparatus 40 is illustrated in FIG. 10.

The rotary machine control apparatus 20 is the rotary machine control apparatus 20 of any one of the first to third embodiments. In the fifth embodiment, the rotary machine control apparatus 20A of the fourth embodiment may be applied instead of the rotary machine control apparatus 20 of any one of the first to third embodiments.

The inference apparatus 50 infers, for the rotary machine control apparatus 20, the length of the current control period T1 and the length of the magnetic-flux control period T2 that enable reduction of the amount of increase in the DC bus voltage in the power converter 11, reduction of the pulsation width of the DC bus voltage, reduction of the pulsation width of the frequency of a magnetic flux vector in the synchronous machine 21, and reduction of the pulsation width of an effective current value of an electric current flowing through the synchronous machine 21. The inference apparatus 50 includes an inference data acquisition unit 51 and an inference unit 52.

The inference data acquisition unit 51 acquires inference data that is the frequency estimation value $\hat{\omega}$ and the effective current value $I_{rms}$, from the voltage command unit 10 of the rotary machine control apparatus 20. The inference data acquisition unit 51 sends the acquired inference data to the inference unit 52.

The inference unit 52 reads, from the learned model storage unit 46, a learned model generated by the machine learning apparatus 40 according to the fourth embodiment. The inference unit 52 inputs the frequency estimation value $\hat{\omega}$ and the effective current value $I_{rms}$, that are inference data, to the learned model, to thereby infer the length of the current control period T1 and the length of the magnetic-flux control period T2. Respective values of the current control period T1 and the magnetic-flux control period T2 are outputted as inference results from the learned model. The inference unit 52 sends, to the rotary machine control apparatus 20, the respective values of the current control period T1 and the magnetic-flux control period T2 outputted from the learned model.

Figure 11:
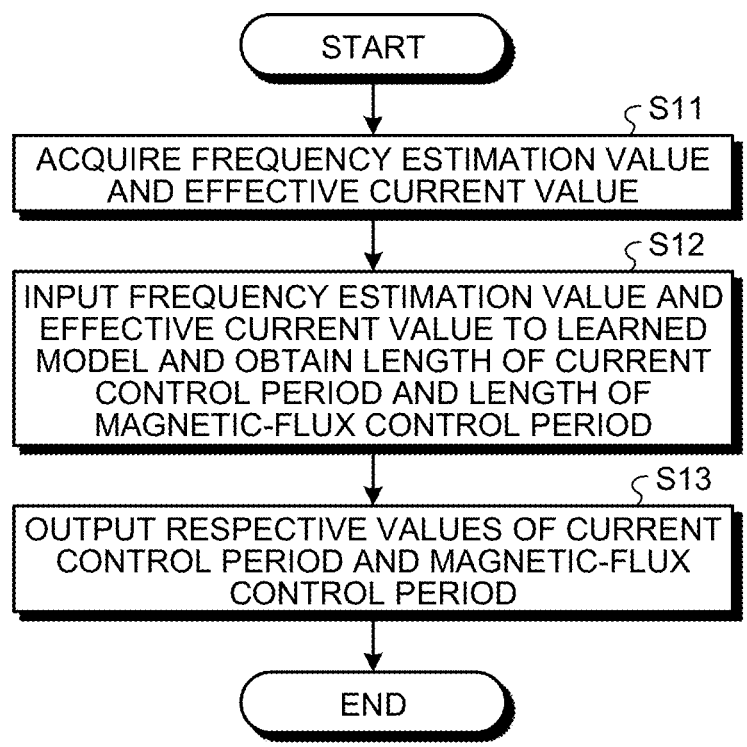
FIG. 11 is a flowchart illustrating a processing procedure of the inference apparatus according to the fifth embodiment.

FIG. 11 is a flowchart illustrating a processing procedure of the inference apparatus 50 according to the fifth embodiment. In step S11, the inference data acquisition unit 51 of the inference apparatus 50 acquires the frequency estimation value $\hat{\omega}$ and the effective current value $I_{rms}$ that are inference data. In step S12, the inference unit 52 of the inference apparatus 50 receives inputs of the frequency estimation value $\hat{\omega}$ and the effective current value $I_{rms}$ to the learned model, and obtains the length of the current control period T1 and the length of the magnetic-flux control period T2.

In step S13, the inference apparatus 50 outputs the respective values of the current control period T1 and the magnetic-flux control period T2 from the inference unit 52 to the rotary machine control apparatus 20. As a result, the inference apparatus 50 ends the processing performed according to the procedure illustrated in FIG. 11.

The inference apparatus 50 illustrated in FIG. 10 is provided outside the rotary machine control apparatus 20. The inference apparatus 50 may be an apparatus built into the rotary machine control apparatus 20. The inference apparatus 50 may be a device that can be connected to the rotary machine control apparatus 20 via a network. The inference apparatus 50 may be an apparatus existing on a cloud server.

In the fifth embodiment, the inference apparatus 50 infers the length of the current control period T1 and the length of the magnetic-flux control period T2 from a learned model based on learning data acquired from the rotary machine control apparatus 20A, and sends the respective values of the current control period T1 and the magnetic-flux control period T2 to a rotary machine control apparatus 20 other than the rotary machine control apparatus 20A. The rotary machine control apparatuses 20 and 20A to which the respective values of the current control period T1 and the magnetic-flux control period T2 are sent may be rotary machine control apparatuses 20 and 20A from which the learning data sets have been acquired, or may be rotary machine control apparatuses 20 and 20A other than the rotary machine control apparatuses 20 and 20A from which the learning data sets have been acquired.

Based on inference using the learned model, the inference apparatus 50 can infer the length of the current control period T1 and the length of the magnetic-flux control period T2 that enable reduction of the amount of increase in the DC bus voltage and reduction of pulsation of each of the DC bus voltage, the frequency, and the effective current value $I_{rms}$.

The rotary machine control apparatus 20 receives the respective values of the current control period T1 and the magnetic-flux control period T2 sent by the inference apparatus 50. The rotary machine control apparatus 20 determines the length of the current control period T1 and the length of the magnetic-flux control period T2 in the start-up control period on the basis of the respective values of the current control period T1 and the magnetic-flux control period T2. The rotary machine control apparatus 20 can achieve reduction of the amount of increase in the DC bus voltage in the power converter 11, reduction of the pulsation width of the DC bus voltage, reduction of the pulsation width of the frequency of a magnetic flux vector in the synchronous machine 21, and reduction of the pulsation width of the effective current value $I_{rms}$ of an electric current flowing through the synchronous machine 21. As a result, the rotary machine control apparatus 20 can stably start up the synchronous machine 21 from the free-run state, in a state in which an increase in the DC bus voltage has been reduced and each pulsation of the DC bus voltage, the frequency, and the effective current value $I_{rms}$ has been reduced. The rotary machine control apparatus 20 can stabilize the start-up of the synchronous machine 21.

Since variations in the DC bus voltage can be reduced, the rotary machine control apparatus 20 can reduce unintended torque generation. The rotary machine control apparatus 20 can start up the synchronous machine 21 from the free-run state, in a condition in which unintended torque generation has been reduced.

Figure 12:
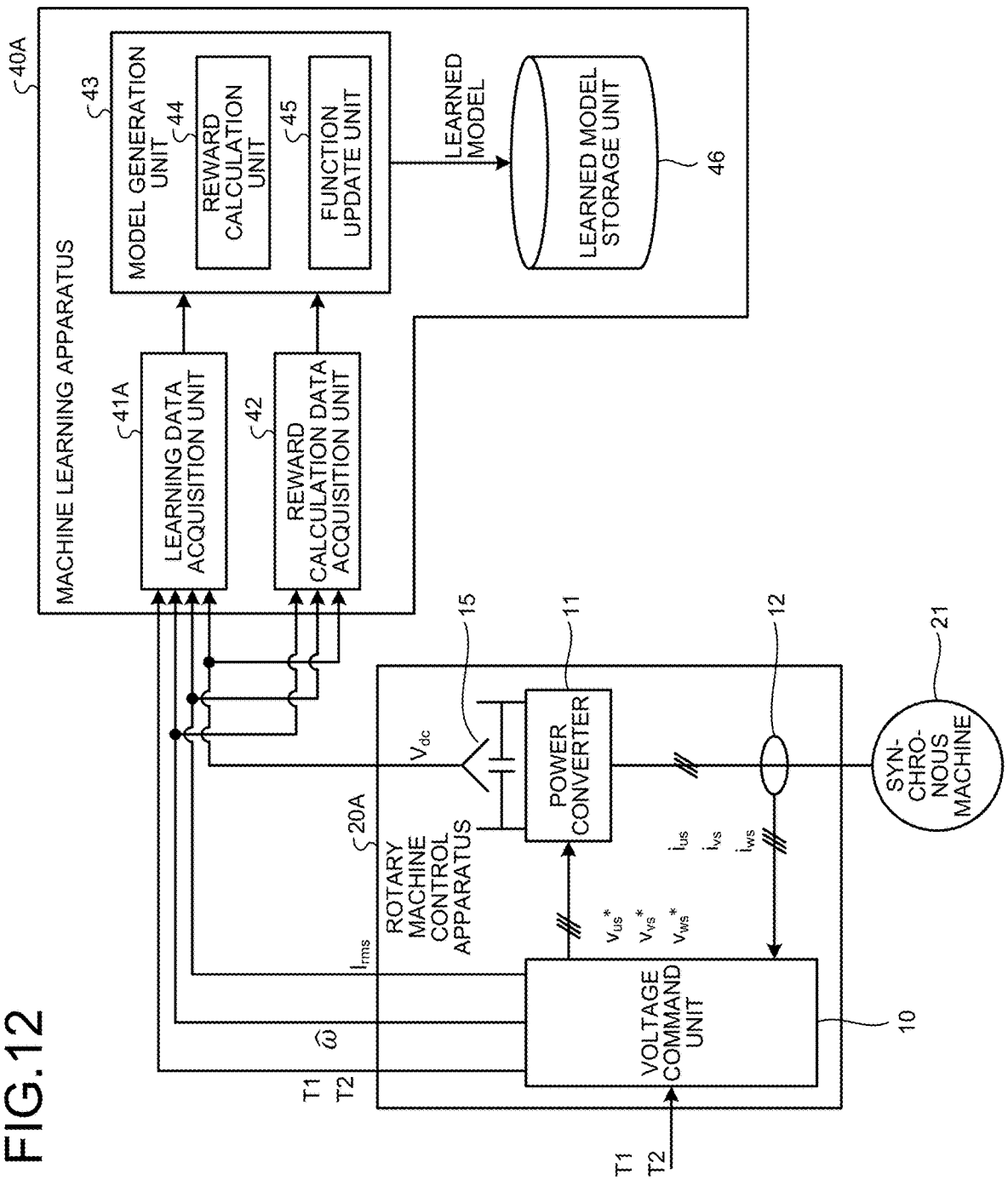
FIG. 12 is a diagram illustrating a machine learning apparatus and a rotary machine control apparatus according to a modification of the fifth embodiment.
Figure 13:
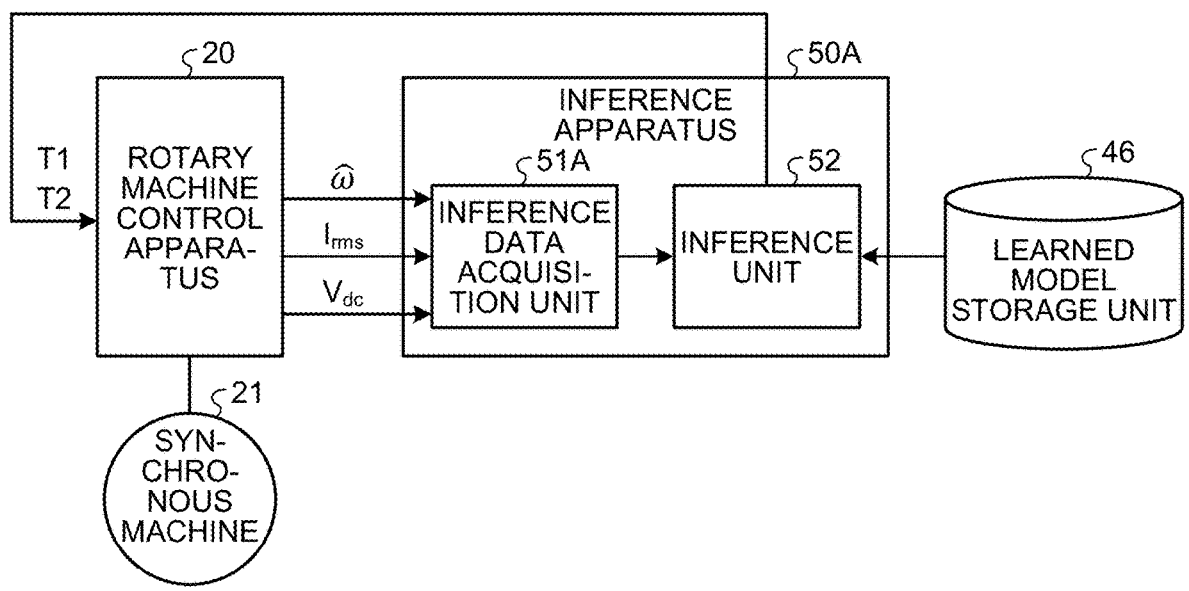
FIG. 13 is a diagram illustrating an inference apparatus and a rotary machine control apparatus according to a modification of the fifth embodiment.

Next, modifications of the machine learning apparatus and the inference apparatus will be described. In the modifications of the fifth embodiment, the bus voltage detection value $V_{dc}$ is included in each of the learning data and the inference data. FIG. 12 is a diagram illustrating a machine learning apparatus 40A and the rotary machine control apparatus 20A according to a modification of the fifth embodiment. FIG. 13 is a diagram illustrating an inference apparatus 50A and the rotary machine control apparatus 20 according to a modification of the fifth embodiment.

As with the learning data acquisition unit 41 illustrated in FIG. 8, a learning data acquisition unit 41A of the machine learning apparatus 40A illustrated in FIG. 12 acquires the respective values of the current control period T1 and the magnetic-flux control period T2, the frequency estimation value $\hat{\omega}$, and the effective current value $I_{rms}$. The learning data acquisition unit 41A further acquires the bus voltage detection value $V_{dc}$ from the voltage detector 15. Learning data to be acquired by the learning data acquisition unit 41A include the respective values of the current control period T1 and the magnetic-flux control period T2, the frequency estimation value $\hat{\omega}$, the effective current value $I_{rms}$, and the bus voltage detection value $V_{dc}$. The learning data acquisition unit 41A produces a data set into which the respective values of the current control period T1 and the magnetic-flux control period T2, the frequency estimation value $\hat{\omega}$, the effective current value $I_{rms}$, and the bus voltage detection value $V_{dc}$ are put together.

The model generation unit 43 generates a learned model with use of the data set produced based on the respective values of the current control period T1 and the magnetic-flux control period T2, the frequency estimation value $\hat{\omega}$, the effective current value $I_{rms}$, and the bus voltage detection value $V_{dc}$. As a result, the machine learning apparatus 40A generates a learned model for inferring the respective values of the current control period T1 and the magnetic-flux control period T2 from the frequency estimation value $\hat{\omega}$, the effective current value $I_{rms}$, and the bus voltage detection value $V_{dc}$.

An inference data acquisition unit 51A of the inference apparatus 50A illustrated in FIG. 13 acquires the frequency estimation value $\hat{\omega}$ and the effective current value $I_{rms}$ from the rotary machine control apparatus 20, as with the inference data acquisition unit 51 illustrated in FIG. 10. The inference data acquisition unit 51A further acquires the bus voltage detection value $V_{dc}$ from the voltage detector 15 of the rotary machine control apparatus 20. Inference data to be acquired by the inference data acquisition unit 51A includes the frequency estimation value $\hat{\omega}$, the effective current value $I_{rms}$, and the bus voltage detection value $V_{dc}$.

The inference unit 52 uses the learned model generated by the machine learning apparatus 40A to infer the length of the current control period T1 and the length of the magnetic-flux control period T2 from the frequency estimation value $\hat{\omega}$, the effective current value $I_{rms}$, and the bus voltage detection value $V_{dc}$. The inference unit 52 inputs the frequency estimation value $\hat{\omega}$, the effective current value $I_{rms}$, and the bus voltage detection value $V_{dc}$, which are inference data, to the learned model, to thereby infer the length of the current control period T1 and the length of the magnetic-flux control period T2.

According to the modifications of the fifth embodiment, the machine learning apparatus 40A can generate a more accurate learned model by adding the bus voltage detection value $V_{dc}$ to the learning data. Based on inference using the learned model, the inference apparatus 50A can infer, with higher accuracy, the length of the current control period T1 and the length of the magnetic-flux control period T2 that enable reduction of the amount of increase in the DC bus voltage and reduction of pulsation of each of the DC bus voltage, the frequency, and the effective current value $I_{rms}$.

The machine learning apparatuses 40 and 40A according to the fourth and fifth embodiments are implemented by much the same hardware configuration as the configuration illustrated in FIG. 7. The learning data acquisition unit 41 or 41A, the reward calculation data acquisition unit 42, and the model generation unit 43 are implemented by the processing circuit 61 including the processor 63 and the memory 64. The learning data acquisition unit 41 or 41A, the reward calculation data acquisition unit 42, and the model generation unit 43 may be implemented by a dedicated processing circuit.

The inference apparatuses 50 and 50A according to the fifth embodiment are implemented by much the same hardware configuration as the configuration illustrated in FIG. 7. The inference data acquisition unit 51 or 51A and the inference unit 52 are implemented by the processing circuit 61 including the processor 63 and the memory 64. The inference data acquisition unit 51 or 51A and the inference unit 52 may be implemented by a dedicated processing circuit.

In the machine learning apparatuses 40 and 40A, an amount of increase in a torque detection value of the synchronous machine 21 may be included in reward calculation data. The reward calculation data acquisition unit 42 of each of the machine learning apparatuses 40 and 40A acquires a torque detection value from a torque detector installed in the synchronous machine 21. The reward calculation data acquisition unit 42 obtains an amount of increase in the torque detection value in the start-up control period. The amount of increase refers to an amount of increase with respect to a state at the time when the synchronous machine 21 is in the driven state.

The reward calculation unit 44 increases a reward when the amount of increase in the torque detection value decreases, but decreases a value for reward when the amount of increase in the torque detection value increases. In this case, the machine learning apparatuses 40 and 40A can each generate a learned model for obtaining the respective values of the current control period T1 and the magnetic-flux control period T2 that enable reduction of an unintended increase in torque.

Furthermore, the torque detection value may be added to each of the learning data and the inference data. The learning data acquisition units 41 and 41A of the machine learning apparatuses 40 and 40A acquire a torque detection value from the torque detector. The inference data acquisition units 51 and 51A of the inference apparatuses 50 and 50A acquire a torque detection value from the torque detector. The machine learning apparatuses 40 and 40A can each generate a more accurate learned model by adding the torque detection value to the learning data. The inference apparatuses 50 and 50A can each infer the length of the current control period T1 and the length of the magnetic-flux control period T2 that enable reduction of an increase in torque, by using the learned model generated by the machine learning apparatuses 40 and 40A.

The configurations set forth in the above embodiments show examples of the contents of the present disclosure. The configuration of each of the embodiments can be combined with the other publicly known techniques. The configurations of the embodiments may be combined with each other as appropriate. It is possible to partially omit or modify the configuration of each of the embodiments without departing from the scope of the present disclosure.

REFERENCE SIGNS LIST 1 controller; 2, 2A, 2B estimator; 10 voltage command unit; 11 power converter; 12 current detector; 15 voltage detector; 20, 20A rotary machine control apparatus; 21 synchronous machine; 31 three-phase dq converter; 32 dq three-phase converter; 33 current controller; 34 switching unit; 35 magnetic flux controller; 40, 40A machine learning apparatus; 41, 41A learning data acquisition unit; 42 reward calculation data acquisition unit; 43 model generation unit; 44 reward calculation unit; 45 function update unit; 46 learned model storage unit; 50, 50A inference apparatus; 51, 51A inference data acquisition unit; 52 inference unit; 61 processing circuit; 62 input unit; 63 processor; 64 memory; 65 output unit.

The invention claimed is:

1. A rotary machine control apparatus comprising:
a current detector to detect an alternating current flowing through a rotary machine and output a current detection value;
a power converter to supply power to the rotary machine by applying an AC voltage based on a voltage command value;
a current controller to adjust the voltage command value so that the current detection value matches a current command value;
an estimator to obtain a magnetic-flux estimation value that is an estimation value of an amplitude of a magnetic flux vector in the rotary machine; and
a magnetic flux controller to adjust the current command value so that the magnetic-flux estimation value matches a set magnetic-flux command value, in a start-up control period from when the rotary machine is put in a state where the rotary machine rotates by inertia after interruption of power supply from the power converter to the rotary machine until the rotary machine returns to a normal driven state based on vector control,
wherein the start-up control period includes a magnetic-flux control period and a current control period prior to the magnetic-flux control period, the current control period being a period in which current control is performed based on a default command value that is a preset current command value, the magnetic-flux control period being a period in which current control is performed based on the current command value outputted by the magnetic flux controller.

2. The rotary machine control apparatus according to claim 1, wherein the current command value to be outputted by the magnetic flux controller is a current command value for a d-axis that is one of two axes in a rotating coordinate system of the rotary machine.

3. The rotary machine control apparatus according to claim 1, wherein the magnetic flux vector is a vector of a primary magnetic flux of the rotary machine or a vector of a secondary magnetic flux of the rotary machine.

4. The rotary machine control apparatus according to claim 1, wherein the magnetic-flux control period is longer than the current control period in the start-up control period.

5. The rotary machine control apparatus according to claim 1, further comprising:
an inference data acquirer to acquire a frequency estimation value of the magnetic flux vector, and an effective current value obtained from the current detection value; and
an inference calculator to infer a length of the current control period and a length of the magnetic-flux control period by inputting the frequency estimation value and the effective current value to a learned model obtained by machine learning.

6. The rotary machine control apparatus according to claim 1, further comprising:
a learning data acquirer to acquire a value indicating the length of the current control period, a value indicating the length of the magnetic-flux control period, the frequency estimation value, and the effective current value; and
a model generator to generate the learned model with use of a data set produced based on the value indicating the length of the current control period, the value indicating the length of the magnetic-flux control period, the frequency estimation value, and the effective current value.

7. A machine learning apparatus for learning a length of a current control period and a length of a magnetic-flux control period for the rotary machine control apparatus according to claim 1, the length of the current control period and the length of the magnetic-flux control period enabling at least one of reduction of an amount of increase in DC bus voltage in the power converter, reduction of a pulsation width of the DC bus voltage, reduction of a pulsation width of frequency of a magnetic flux vector in the rotary machine, and reduction of a pulsation width of an effective current value of an electric current flowing through the rotary machine, the machine learning apparatus comprising:
a learning data acquirer to acquire a value indicating the length of the current control period, a value indicating the length of the magnetic-flux control period, a frequency estimation value of the magnetic flux vector, and the effective current value;
a model generator to generate a learned model with use of a data set produced based on the value indicating the length of the current control period, the value indicating the length of the magnetic-flux control period, the frequency estimation value, and the effective current value; and
a learned model storage medium to store the learned model.

8. The machine learning apparatus according to claim 7, further comprising:
a voltage detector to detect the DC bus voltage and output a bus voltage detection value; and
a reward calculation data acquirer to which the bus voltage detection value, the frequency estimation value, and the effective current value are inputted, the reward calculation data acquirer obtaining reward calculation data that is at least one of an amount of increase in pulsation width of the bus voltage detection value, an amount of increase in pulsation width of the frequency estimation value, an amount of increase in pulsation width of the effective current value, and an amount of increase in the bus voltage detection value, wherein the model generator includes:

a reward calculator to calculate a reward for a combination of the value indicating the length of the current control period, the value indicating the length of the magnetic-flux control period, the frequency estimation value, and the effective current value, on a basis of the reward calculation data; and a function updater to update a function for obtaining the value indicating the length of the current control period and the value indicating the length of the magnetic-flux control period from the frequency estimation value and the effective current value, according to the reward, and the function updater outputs the learned model generated as a result of updating the function.

9. The machine learning apparatus according to claim 8, wherein the learning data acquirer further acquires the bus voltage detection value, and the model generator generates the learned model with use of the data set produced based on the value indicating the length of the current control period, the value indicating the length of the magnetic-flux control period, the frequency estimation value, the effective current value, and the bus voltage detection value.

10. An inference apparatus for inferring a length of a current control period and a length of a magnetic-flux control period for the rotary machine control apparatus according to claim 1, the length of the current control period and the length of the magnetic-flux control period enabling at least one of reduction of an amount of increase in DC bus voltage in the power converter, reduction of a pulsation width of the DC bus voltage, reduction of a pulsation width of frequency of a magnetic flux vector in the rotary machine, and reduction of a pulsation width of an effective current value of an electric current flowing through the rotary machine, the inference apparatus comprising:

an inference data acquirer to acquire a frequency estimation value of the magnetic flux vector, and an effective current value obtained from the current detection value; and an inference calculator to infer the length of the current control period and the length of the magnetic-flux control period by inputting the frequency estimation value and the effective current value to a learned model for inferring the length of the current control period and the length of the magnetic-flux control period from the frequency estimation value and the effective current value.

11. The inference apparatus according to claim 10, wherein the inference data acquirer further acquires a bus voltage detection value that is a detection value of the DC bus voltage, and the inference calculator infers the length of the current control period and the length of the magnetic-flux control period from the frequency estimation value, the effective current value, and the bus voltage detection value with use of a learned model for inferring the length of the current control period and the length of the magnetic-flux control period from the frequency estimation value, the effective current value, and the bus voltage detection value.

* * * * *